United States Patent
Kanai

(10) Patent No.: US 7,206,901 B2
(45) Date of Patent: Apr. 17, 2007

(54) STORAGE CONTROL SYSTEM

(75) Inventor: Hiroki Kanai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 365 days.

(21) Appl. No.: 10/859,176

(22) Filed: Jun. 3, 2004

(65) Prior Publication Data

US 2005/0223171 A1 Oct. 6, 2005

(30) Foreign Application Priority Data

Apr. 1, 2004 (JP) ............... 2004-109252

(51) Int. Cl.
*G06F 12/00* (2006.01)
*G06F 13/00* (2006.01)
(52) U.S. Cl. .................. 711/114; 711/147; 711/154
(58) Field of Classification Search ...................... None
See application file for complete search history.

(56) References Cited

U.S. PATENT DOCUMENTS

| 7,055,059 B2* | 5/2006 | Yanai et al. ................ 714/7 |
| 7,065,599 B2* | 6/2006 | King et al. ................ 710/301 |
| 2002/0152339 A1 | 10/2002 | Yamamoto ................ 710/36 |
| 2002/0178143 A1 | 11/2002 | Fujimoto ................ 707/1 |
| 2003/0033363 A1* | 2/2003 | Garnett et al. ................ 709/203 |
| 2003/0033459 A1* | 2/2003 | Garnett ................ 710/100 |
| 2003/0101304 A1* | 5/2003 | King et al. ................ 710/301 |
| 2003/0105767 A1 | 6/2003 | Sonoda et al. ................ 707/100 |
| 2003/0105903 A1* | 6/2003 | Garnett et al. ................ 710/300 |
| 2003/0204671 A1 | 10/2003 | Matsunami et al. ........ 711/112 |
| 2004/0199719 A1 | 10/2004 | Valin et al. |
| 2004/0205124 A1* | 10/2004 | Limprecht et al. ........... 709/204 |
| 2004/0205781 A1* | 10/2004 | Hill et al. ................ 719/328 |
| 2004/0210713 A1 | 10/2004 | Kanai |
| 2004/0268358 A1* | 12/2004 | Darling et al. ................ 718/105 |
| 2005/0033915 A1 | 2/2005 | Matsunami et al. |
| 2005/0071350 A1* | 3/2005 | Artale et al. ................ 707/100 |

FOREIGN PATENT DOCUMENTS

| EP | 1357463 | 10/2003 |
| JP | 2001-256003 | 9/2001 |
| JP | 2002-123479 | 4/2002 |
| JP | 2002-333956 | 11/2002 |
| JP | 2003-208267 | 7/2003 |
| JP | 2003-241905 | 8/2003 |
| JP | 2003-316713 | 11/2003 |
| JP | 2003-323261 | 11/2003 |
| JP | 2003316713 | 11/2003 |
| WO | 03014894 | 2/2003 |

\* cited by examiner

*Primary Examiner*—Reginald Bragdon
*Assistant Examiner*—Shawn Gu
(74) *Attorney, Agent, or Firm*—Mattingly, Stanger, Malur & Brundidge, P.C.

(57) ABSTRACT

The enclosure 10 in which the storage control system 600 is constructed comprises a scale-out NAS head group 111 constituted by two or more NAS heads, and a scale-up NAS head 110H that is a higher performance NAS head than each of NAS head members 110L that are the NAS heads constituting the scale-out NAS group 111. The enclosure 10 permits insertion into general-purpose slots 104 in which the NAS head members 110L and another type of channel control unit 112 that differs from the NAS head members 110L are inserted. The scale-up NAS head 110H is mounted within the enclosure 10 in a different location from the general-purpose slots 104.

8 Claims, 16 Drawing Sheets

FIG. 12(A)
FIG. 12(B)
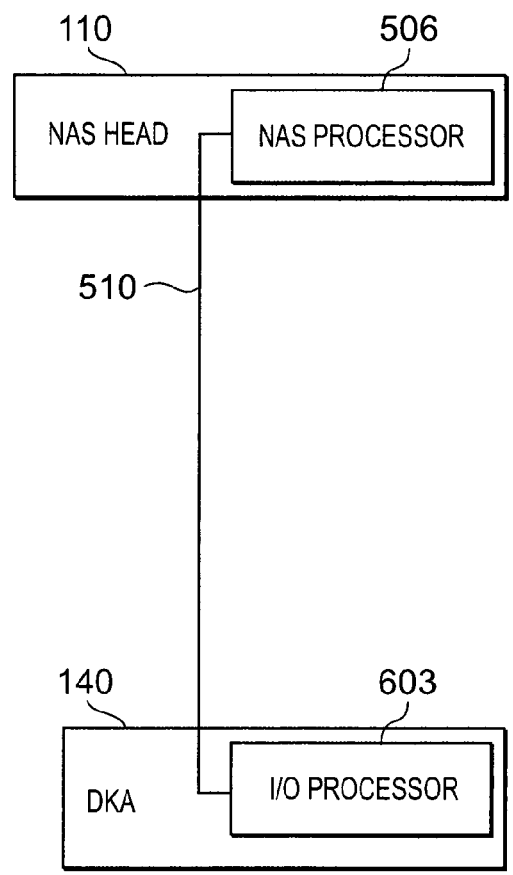
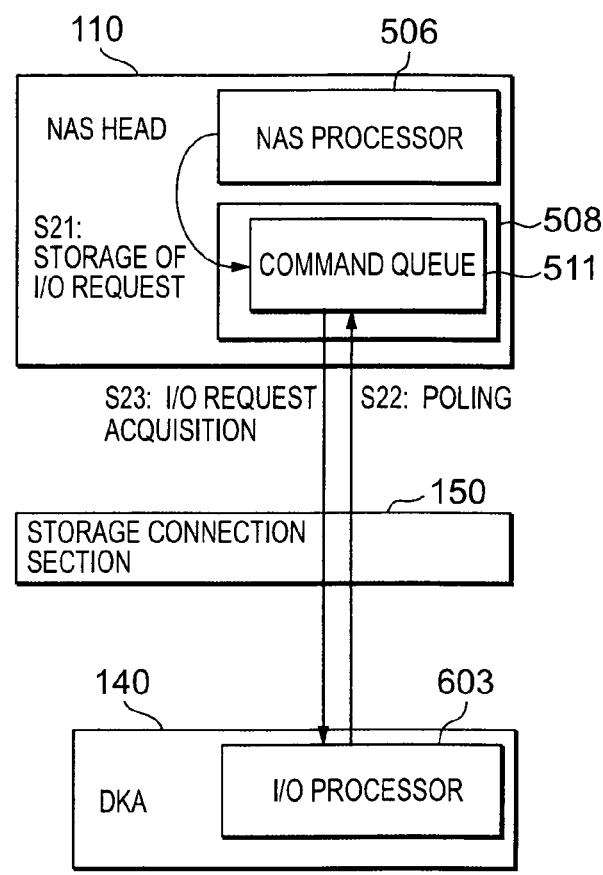

STORAGE CONTROL SYSTEM

CROSS-REFERENCE TO PRIOR APPLICATION

This application relates to and claims priority from Japanese Patent Application No. 2004-109252, filed on Apr. 1, 2004 the entire disclosure of which is incorporated herein by reference.

FIELD OF THE INVENTION

The present invention relates to a storage control system such as a RAID system, for example.

BACKGROUND OF THE INVENTION

A database system that handles large-scale data such as a data center, for example, manages data by using a storage control system that is constituted separately from a host computer. This storage control system is a disk array system such as a RAID (Redundant Array of Independent Inexpensive Disks) that is constituted by arranging a multiplicity of storage devices in the form of an array, for example.

As disclosed in Japanese Patent Application Laid Open No. 2003-316713, for example, a storage control system of this kind comprises a network channel adapter (hereinafter 'CHN') that processes a file unit I/O request, and can therefore be NAS (Network Attached Storage).

The above-mentioned storage control system can operate as a file server by mounting a CHN. However, it is considered more useful if the storage control system can operate as a different type of server in addition to as a file server. More specifically, the implementation of a so-called server three-level model with a single storage control system, for example, is considered desirable.

As a method for implementing operation as a different type of server in addition to a file server with a single storage control system, a method that increases individual CHN performance, for example, may be considered. However, it is difficult to actually execute this method. This is because there is normally a predetermined form factor for the storage control system.

More specifically, for example, the CHN can be a thin board overall as shown in FIG. 3 of the above publication. For this reason, a plurality of adaptor slots in which a CHN is inserted can be arranged at a narrow pitch, as shown in FIG. 2 of the above publication. Each adapter slot is constituted so that the user is able to insert, not only the CHN, but also another optional adapter board (a disk adapter, for example) as mentioned in FIG. 2 and paragraph 27 of the above publication. In such a case, when the CHN is simply afforded a high performance, same must generate more heat than the other adaptor board and requires a lot of electrical power, meaning that restrictions on the form factor relating to the adapter slot cannot be adhered to.

In addition, as another method for implementing the above, a method that newly constructs a storage control system whose form factor is more relaxed overall may also be considered. However, when this method is simply adopted, in cases where, for example, a storage control system form factor is designed for a SAN (Storage Area Network), there is then the problem that a design for the new CHN-based form factor (that is, a form factor for NAS) is then required.

Furthermore, when a NAS form factor is adopted, multiple SAN adaptor boards cannot be installed in the storage control system, for example, and there is the problem that the mount efficiency then drops.

SUMMARY OF THE INVENTION

Therefore, it is an object of the present invention to increase the performance of a storage control system with minimal changes to the form factor. Specifically, the NAS-related performance is increased without implementing large changes to the form factor even when the storage control system is designed with a SAN form factor, for example.

Further objects of the present invention will become apparent from the following description.

The storage control system according to a first aspect of the present invention comprises a storage device that stores data; a storage device control unit that reads or writes data with respect to the storage device; a plurality of channel control units that operate as servers; one or more memories for storing the data exchanged between the storage device control unit and a channel control unit selected from among the plurality of channel control units; a data communication medium; and an interserver communication medium. The data communication medium is connected to the storage device control unit, the plurality of channel control units, and the one or more memories, and constitutes a communication medium for the data exchanged between the storage device control unit, the selected channel control unit and the one or more memories. The interserver communication medium is connected to the plurality of channel control units and constitutes a medium for communications between each of the plurality of channel control units and the other channel control units. The plurality of channel control units are mounted in the same enclosure, and comprise two or more NAS head members that constitute a scale-out NAS head group and a scale-up NAS head of a higher performance than the NAS head member. The enclosure comprises a plurality of general-purpose slots into which the NAS head member and another type of channel control unit that differs from the NAS head member are inserted. Each of the two or more NAS head members is mounted inserted in the general-purpose slots. The scale-up NAS head is mounted within the enclosure in a different location from the plurality of general-purpose slots.

In a first embodiment of the storage control system according to the first aspect of the present invention, at least one of the NAS head member, the scale-up NAS head and the storage device control unit comprises a first processor that processes block-level data. The NAS head member comprises one or more first memories that are different from the one or more memories, and one or more second processors of a higher performance than the first processor, each of the one or more first memories being used by one second processor among the one or more second processors rather than being shared by the one or more second processors. A scale-out NAS head group is provided by performing serial or parallel processing by using a plurality of these NAS head members. The scale-up NAS head comprises a second memory that is different from the one or more memories, and a plurality of third processors of a higher performance than the first processor, the second memory being shared by the plurality of third processors. The second and third processors may be the same type of processor (processors with the same operating frequency, for example).

In a second embodiment of the storage control system according to the first aspect of the present invention, a database exists in the storage device of the first embodiment. The second processor of the NAS head member operates as a WEB server by reading a computer program for operation as a WEB server. The plurality of third processors of the scale-up NAS head operates as a database server by reading a computer program for operation as a database server that processes the database.

In a third embodiment of the storage control system according to the first aspect of the present invention, the second processor of the NAS head member of the second embodiment sends an inquiry in accordance with access by an external device that is connected to an external communication network of the storage control system to the scale-up NAS head via the interserver communication medium. The inquiry thus sent is stored in the second memory of the scale-up NAS head, for example. At least one of the plurality of third processors processes the database via the storage device control unit in accordance with the inquiry, and thus reads response data that is data for the inquiry via the data communication medium to the one or more memories and sends a response message for the inquiry to the second processor of the NAS head member via the interserver communication medium. The second processor receives the inquiry message, acquires the response data stored in the one or more memories via the data communication medium, and provides the external device with the acquired response data or with data that is obtained by processing the response data.

In a fourth embodiment of the storage control system according to the first aspect of the present invention, when the data and interserver messages are exchanged between the NAS head member and the scale-up NAS head, the interserver messages are exchanged via the interserver communication medium; and the data is exchanged via the one or more memories and the data communication medium.

In a fifth embodiment of the storage control system according to the first aspect of the present invention, the data communication medium has a wider data transfer bandwidth than the interserver communication medium; and the interserver communication medium has a larger number of communication paths than the data communication medium. More specifically, for example, the data communication medium is a high-speed crossbar switch or SAN (Storage Area Network) and the interserver communication medium is a LAN (Local Area Network).

In a sixth embodiment of the storage control system according to the first aspect of the present invention, the scale-up NAS head comprises a second memory that is different from the one or more memories; a plurality of third processors that share the second memory, the processors being of a higher performance than the first processor; a communication controller (a LAN controller, for example) that comprises a plurality of communication ports connected to a plurality of transfer paths that are contained in the interserver communication medium; and a memory controller that receives, from the communication controller, an interserver message received from the NAS head member by the communication port. The memory controller selects a third processor for processing the received interserver message from among the plurality of third processors on the basis of which communication port among the plurality of communication ports has received the interserver message, and causes the selected third processor to process the received interserver message.

In a seventh embodiment of the storage control system according to the first aspect of the present invention, both the scale-up NAS head and the NAS head member comprise a communication interface that is connected to an external communication network of the storage control system.

In an eighth embodiment of the storage control system according to the first aspect of the present invention, the second processor of the first channel control unit of the seventh embodiment writes failure generation information to the effect that the failure has occurred in the shared memory. The fourth processor of each of the plurality of second channel control units and the sixth processor of each of the one or more third channel control units access the shared memory, and, when the fourth processor detects the failure generation information before the sixth processor, the fourth processor disregards this failure generation information.

In a ninth embodiment of the storage control system according to the first aspect of the present invention, each of the NAS head members and the scale-up NAS heads comprises a NAS processor that converts file-level data to block-level data; and the storage device control unit comprises an input/output processor that acquires and processes the block-level data thus converted by the NAS processor. In this case, for example, a dedicated interrupt line is provided between the NAS processor and the input/output processor, and the NAS processor transfers the block-level data to the input/output processor via the dedicated interrupt line. Alternatively, for example, a queue for temporarily storing the block-level data is provided and the input/output processor performs poling of the queue. Thus, when the NAS processor has stored the block-level data in the queue, the input/output processor acquires and processes the block-level data from the queue.

The storage control system according to the present invention can be implemented more abstractly as follows, for example.

That is, the storage control system comprises a storage device control unit that reads or writes data with respect to a storage device that stores data; a plurality of channel control units that operate as servers; one or more memories in which the data exchanged between the storage device control unit and the channel control unit selected from among the plurality of channel control units is stored; and a data communication medium connected to the storage device control unit, the plurality of channel control units and the one or more memories that constitutes a communication medium for the data exchanged between the storage device control unit, the selected channel control unit and the one or more memories. The plurality of channel control units comprises two or more scale-out channel members that constitute a scale-out channel control unit group, and a scale-up channel constituting a channel control unit of a higher performance than the scale-out channel members. The storage control system further comprises an interserver communication medium constituting a medium for communications between the scale-out channel member and the scale-up channel is provided separately from the data communication medium. Two or more scale-out channel members constituting a scale-out channel control unit group may execute processing that permits parallel processing as per a WEB server or the like, for example. On the other hand, the scale-up channel may execute processing that is difficult to perform in parallel as per a database server or the like (processing that is more preferably performed by serial processing, for example).

A method according to a second aspect of the present invention is a data processing method for the storage control system that comprises first to fifth steps. In the first step, a scale-out channel member selected from among two or more scale-out channel members constituting a scale-out channel control unit group receives access from an external device (a host device, for example) via a communication network. In the second step, the selected scale-out channel member sends an inquiry based on this access to a scale-up channel control unit via an interserver communication medium. In the third step, the scale-up channel control unit communicates with a storage device control unit, which is permitted access to a storage device, via a data communication medium, and thus reads data in accordance with the inquiry to one or more memories that are connected to the data communication medium. In the fourth step, the scale-up channel control unit sends a response message to the selected scale-out channel member via the interserver communication medium. In the fifth step, the selected scale-out channel member receives the response message, reads data stored in the one or more memories via the data communication medium, and then sends the data thus read to the external device.

BRIEF DESCRIPTION OF THE DRAWINGS

FIG. 12 shows an example of data communications between a DKA 22 and at least one of the scale-up NAS 110H and the scale-out NAS member 110L of a second modification of the present invention;

DESCRIPTION OF THE PREFERRED EMBODIMENT

An embodiment of the present invention will be described below with reference to the drawings.

Figure 1:
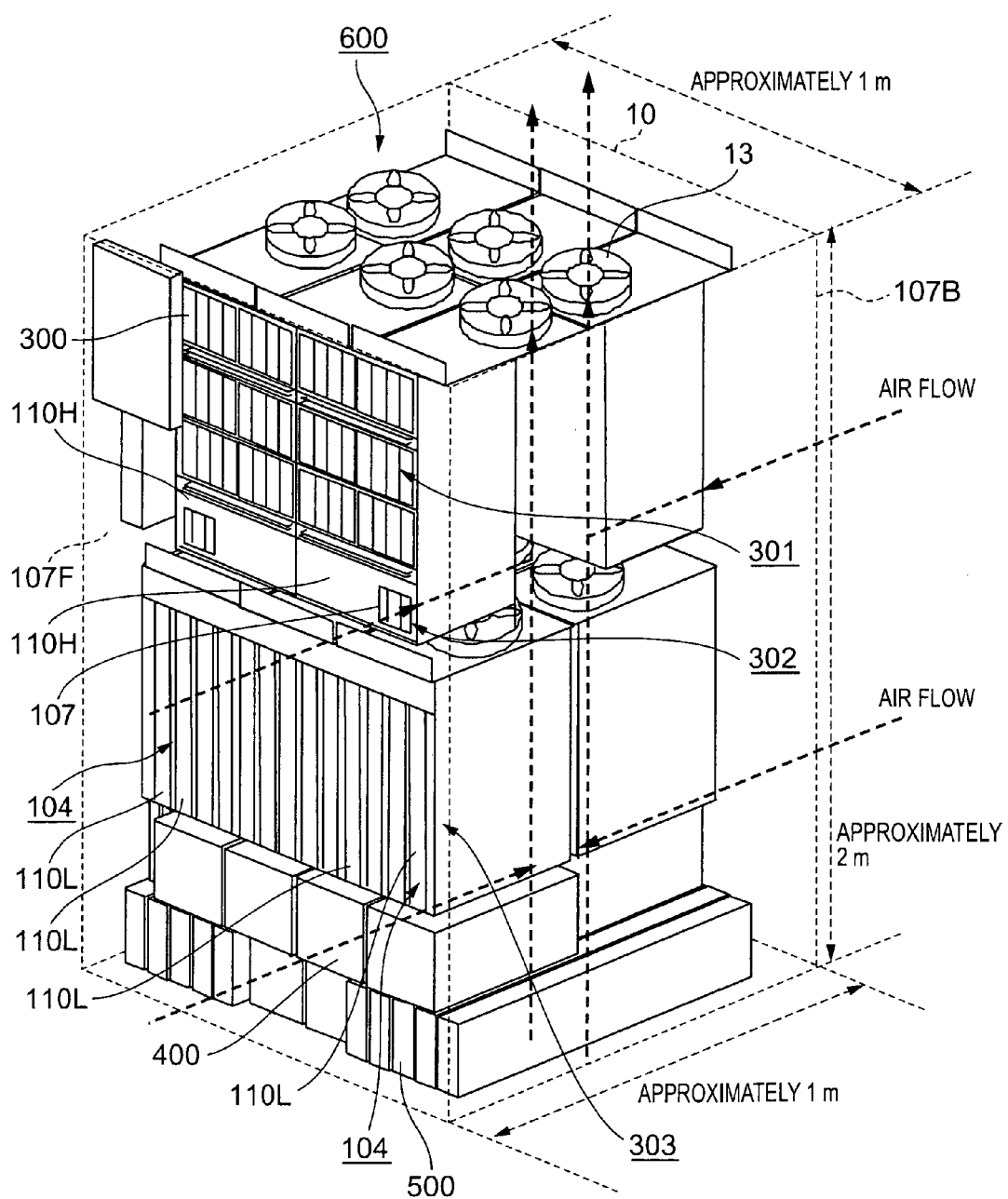
FIG. 1 is an external-view schematic of a storage control system according to an embodiment of the present invention.

FIG. 1 shows an external-view schematic of the storage control system according an embodiment of the present invention.

The storage control system 600 can be constructed within one enclosure 10, for example. Further, in order to facilitate understanding of the constitution within the enclosure 10, the enclosure 10 is shown by imaginary lines (dotted lines in FIG. 1).

The enclosure 10 is dimensioned such that the length thereof in the vertical and horizontal directions is approximately one meter and the height is approximately two meters, for example. The enclosure 10 comprises, for example, on the front side 107F and the rear side 107B, a storage device housing case 301 in which a plurality of storage devices 300 is inserted, a scale-up NAS housing case 302 in which one or a plurality (two, for example) of scale-up NAS heads (hereinafter abbreviated as 'scale-up NAS') 110H are inserted, and a blade housing unit 303 in which a plurality of types of adapter blade are inserted. The enclosure 10 further comprises a plurality of power units 400 and a plurality of battery units 500, which are each detachably provided in the enclosure 10. A plurality of fans 13 is further provided in the enclosure 10.

A plurality of storage devices 300 is arranged in the form of an array in the storage device housing case 301. In this embodiment, the storage device 300 is a hard disk drive but is not limited to a hard disk drive in the modifications. Optional storage devices such as an optical disk drive (DVD drive, for example), a magnetic tape drive, and so forth, may be adopted.

Figure 2A:
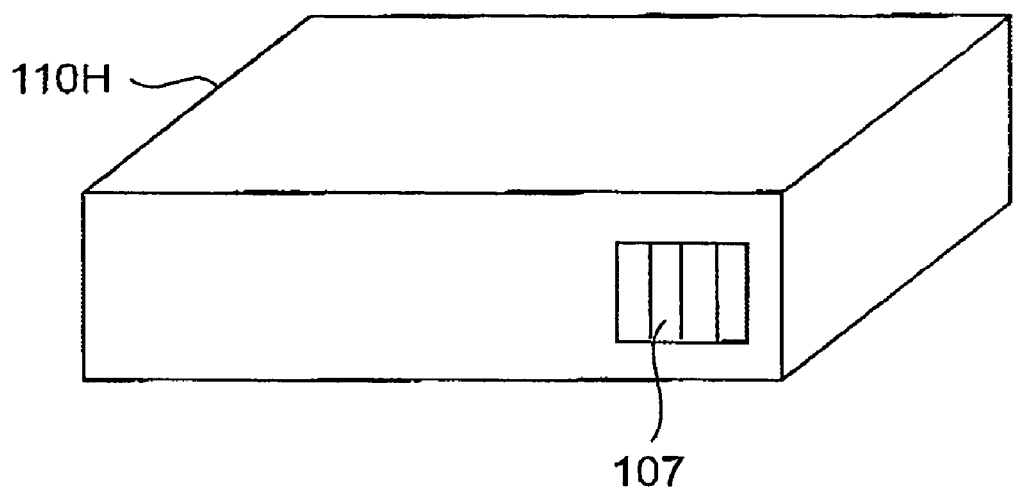
FIG. 2 is an external-view schematic of a scale-up NAS 110H and a scale-out NAS member 110L.

A box-shaped scale-up NAS 110H (a so-called 1U server being a specific example), which has an air inlet 107 as shown in FIG. 2(A) in the front side thereof, for example, is inserted in the scale-up NAS housing case 302. The scale-up NAS housing case 302 is provided in a different location from the blade-housing unit 303.

Figure 2B:
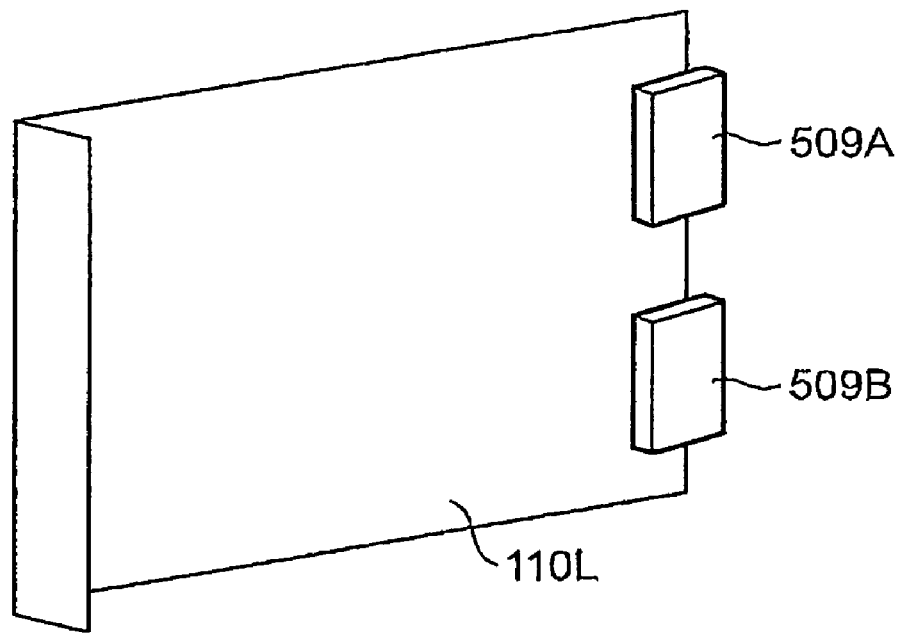

A plurality of laterally aligned blade slots 104 is provided in the blade housing unit 303. The interval between one blade slot 104 and an adjoining blade slot 104 is narrower than the width of the blade slots 104. An optional adapter blade among a plurality of types of adapter blade can be inserted in the blade slots 104 respectively. In other words, a plurality of types of adapter blade are created in accordance with the form factor relating to the blade slots 104 respectively. The plurality of types of adapter blade include, for example, a Fibre Channel adapter blade, which receives a block-level I/O request (input/output request) via a Fibre Channel, an integrated NAS blade 110L, which receives a file-level I/O request via the Internet or similar, a disk adapter blade, which controls the reading or writing of data with respect to the storage devices 300, and a cache-memory adapter blade, which will be described subsequently. The integrated NAS blade 110L is a blade-shaped NAS head, as shown in FIG. 2(B), for example, and comprises a connector 509A, which links to a storage connection section (described subsequently), and a connector 509B, which links to a server connection section (described subsequently). Because a high-performance processor (a processor with a higher operating frequency than the subsequently described I/O processor that processes block-level I/O requests, for example) is mounted in the integrated NAS blade 110L so that same operates as at least a file server, generally speaking, the amount of heat generated by the integrated NAS blade and the amount of electrical power consumed thereby are large in comparison with other types of adapter blade. For this reason, based on the relationship of at least one form factor among heat, cooling, and electrical power form factors, for example, up to N integrated NAS blades (K>N, N≧2, where K=32 and N=8, for example) in K blade slots 104 can be mounted in the blade housing unit 303. One scale-out NAS head group is constructed by two or more integrated NAS blades among the N integrated NAS blades. Hereinafter, an integrated NAS blade constituting a scale-out NAS head group will be abbreviated to 'scale-out NAS member'.

In the storage control system 600, both the scale-up NAS 110H and the scale-out NAS member 110L are cooled by a cooling system, for example. Further, with the storage control system 600, air with heat taken from the scale-up NAS 110H and air with heat taken from the scale-out NAS member 110L are expelled in the same direction. More specifically, for example, as illustrated in FIG. 1, air that is taken in via the air inlet 107 from outside the scale-up NAS 110H (the front side 107F or rear side 107B, for example) is fed toward the center of the enclosure 10 before being fed to the top of the enclosure 10 and expelled to the outside of the enclosure 10 via fans 13. Air that is taken in from outside the scale-out NAS member 110L (below the front side 107F and at the bottom of the enclosure 10, for example) is also fed upward from the center of the enclosure 10 and expelled to outside the enclosure 10 via the fans 13.

Figure 3:
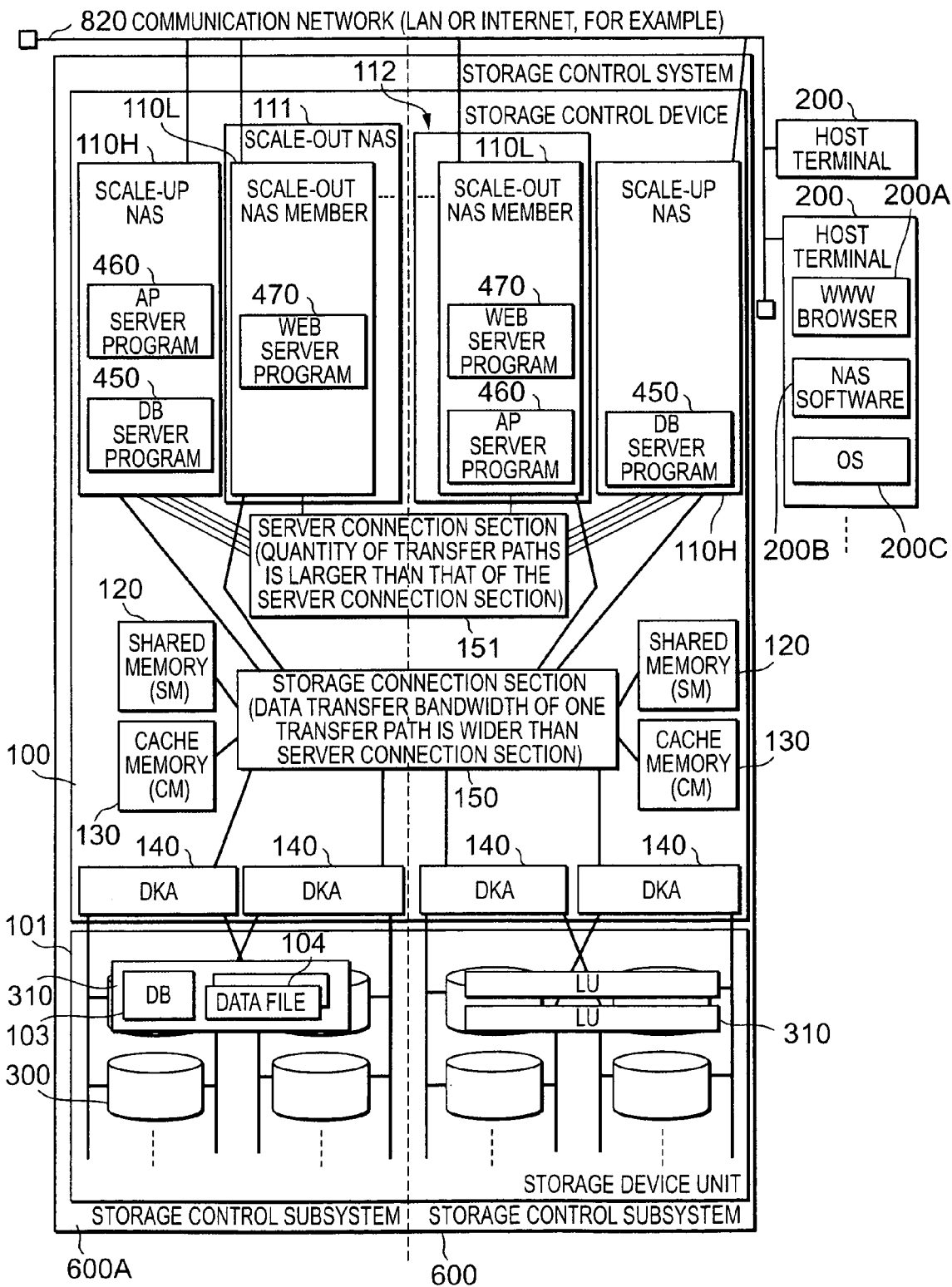
FIG. 3 is a block diagram showing the constitution of a computer system that comprises the storage control system according to this embodiment.

FIG. 3 is a block diagram showing the constitution of a computer system that comprises the storage control system according to this embodiment.

In the computer system 1, one or more host terminals 200 and a storage control system 600 are connected to a communication network (a LAN or the Internet, for example) 820. The communication network 820 is a communication network for exchanging file-level data. A LAN, the Internet, a dedicated line, or a public line, or the like, for example, can be suitably used depending on the case.

Each of one or a plurality of host devices 200 is a computer device that comprises information processing resources such as a CPU (Central Processing Unit), memory, and so forth, for example, and is constituted as a personal computer, workstation, mainframe, or the like, for example. The host terminal 200 comprises information inputting devices (not shown) such as a keyboard switch, pointing device, microphone, for example, and information outputting devices (not shown) such as a monitor display or speaker, for example. In addition, the host terminal 200 comprises a WWW browser 200A, NAS usage software 200B for using a NAS, and an OS (operating system) such as a Windows (registered trademark) or UNIX (registered trademark) operating system, for example. The host terminal 200 issues a request for a data input/output in file units to the storage control system 600 by designating a file name, for example. Where the NAS usage software 200B is concerned, when the OS 200C is UNIX (registered trademark), this software 200B is an NFS (Network File System), and is a CIFS (Common Interface File System) when the OS200C is a Windows (registered trademark), for example.

The storage control system 600 is a RAID system that comprises a multiplicity of storage devices 300 arranged in the form of an array, for example. The storage control system 600 comprises multiple (duplicate), for example, storage control subsystems 600A, for example. The storage control subsystems 600A can be broadly classified as a storage control device 100, and a storage device unit 101. The storage control device 100 comprises a plurality of channel control units 112, a plurality of disk adapters (hereinafter 'DKA') 140, a cache memory 130, a shared memory 120, a storage connection section 150, and a server connection section 151, for example. The plurality of channel control units 112 includes two or more scale-out NAS members 110L constituting a scale-out NAS head group ('scale-out group NAS' hereinafter) 111, and a scale-up NAS 110H (hereinafter called 'NAS adapters' when a general term is employed for scale-out NAS members and scale-up NAS).

The NAS adapters 110L and 110H perform data communications with the host terminal 200. The NAS adapters 110L and 110H are constituted as a microcomputer system that comprises a CPU, memory, and so forth, for example, and analyze and execute a variety of commands that are received from the host terminal 200. The NAS adapters 110L and 110H are each allocated a network address (an IP address or WWN, for example) so that these adapters may be identified. Each of the NAS adapters 110L and 110H can act as NAS (Network Attached Storage) that receives an I/O command in file units (for example, a command including a file name and an instruction to read or write a file with this file name, hereinafter known as a 'file I/O command') from the host terminal 200 via the communication network 820, and then processes this file I/O command. Each scale-out NAS member 110L constituting a scale-out NAS 111 acquires a computer program for operation as a broadband server of the so-called server three-level model, such as a WEB server, for example ('WEB server program' hereinbelow) 470, and operates according to the program 470. The scale-up NAS 110H acquires a computer program for operation as a backend server of the so-called server three-level model, such as a database server, for example (hereinafter 'DB server program') 450, and operates in accordance with this program 450. Further, a computer program for operating as a Mid-tier server of the server three-level model, such as an application server, for example ('AP server program' hereinafter) 460 may be acquired by one or both the scale-out NAS 110L and scale-up NAS 110H. More specifically, for example, the scale-out NAS member 110L may acquire the WEB server program 470 and the AP server program 460 and thus operate as a WEB application server.

Each DKA 140 exchanges data with a logical storage unit ('LU' hereinafter) 310 within the storage device unit 101. Each DKA 140 comprises a communication port (not shown) for a connection to the storage device 300 that comprises the LU 310. Further, each DKA 140 is constituted as a microcomputer system that comprises a CPU, memory, or the like. Each DKA 140 acquires data that has been written from the scale-out NAS member 110L or scale-up NAS 110H to the cache memory 130, and writes this data to the LU 310, storing data read from the LU 310 in the cache memory 130. Each DKA 140 converts a logical address to a physical address when data is inputted to or outputted from the LU 310.

The cache memory (sometimes abbreviated to 'CM' below) 130 is volatile or nonvolatile memory, for example, and temporarily stores data received from the host terminal 200, data read from the LU 310 (described subsequently), and so forth.

The shared memory (sometimes abbreviated as 'SM' hereinafter) 120 is nonvolatile memory, for example, and stores control information related to data exchanged with the host devices (information indicating which data is to be stored in which cache region secured in the CM 130, for example. Further, a work region (a region for temporarily storing messages exchanged between each channel control unit 112 and the CPU of the DKA 140, for example) is established, for example, in the shared memory 120. In the illustrated example, the CM 130 and SM 120 are physically separated but may also be one memory. In this case, the memory space in the memory may be logically divided into a CM space and an SM space.

The storage connection section 150 mutually connects each channel control unit 112, each DKA 140, the cache memory 130, and the shared memory 120. The storage connection section 150 can be constituted as a high-speed bus such as an ultrafast crossbar switch or similar that performs a data transfer by means of a high-speed switching operation, for example. The storage connection section 150 is a communication medium for data exchanged between each channel control unit 112 and each DKA 140 via the cache memory 130. For example, the data transfer bandwidth of each transfer path in the storage connection section 150 is desirably wider than that of the server connection section 151.

Each channel control unit 112 and one or more other channel control units 112 are connected to the server connection section 151. The server connection section 151 is a communication medium for interserver messages that are exchanged between each channel control unit 112 and other channel control units 112. Further, the server connection section 151 may have any constitution as long as same is a dedicated network between NAS adapters. For example, the server connection section 151 maybe a LAN or Fibre. For example, the number of transfer paths in the server connection section 151 is desirably greater than that of the storage connection section 150. More specifically, for example, there is a greater number of communication ports connected to the server connection section 151 mounted in each of the NAS adapters than there are communication ports connected to the storage connection section 150, and each of the multiple communication ports is connected to the server connection section 151.

A plurality of storage devices 300 arranged in the form of an array is contained in the storage device unit 101. Devices such as hard disks, flexible disks, magnetic tape, semiconductor memory, and optical disks, for example, can be used as the storage devices 300. A plurality of logical units (abbreviated to 'LU' hereinafter) 310 constituting logical storage devices are provided in the storage region of the storage device 300. A database (relational database or object database, for example) 103 and one or more data files 104 are stored in a certain LU 310. File metadata relating to data stored in the LU may be stored in each LU 310. Attribute information (such as file names and storage destination addresses) relating to each file stored in the LU 310 is registered as the file metadata of each LU 310.

Figure 4:
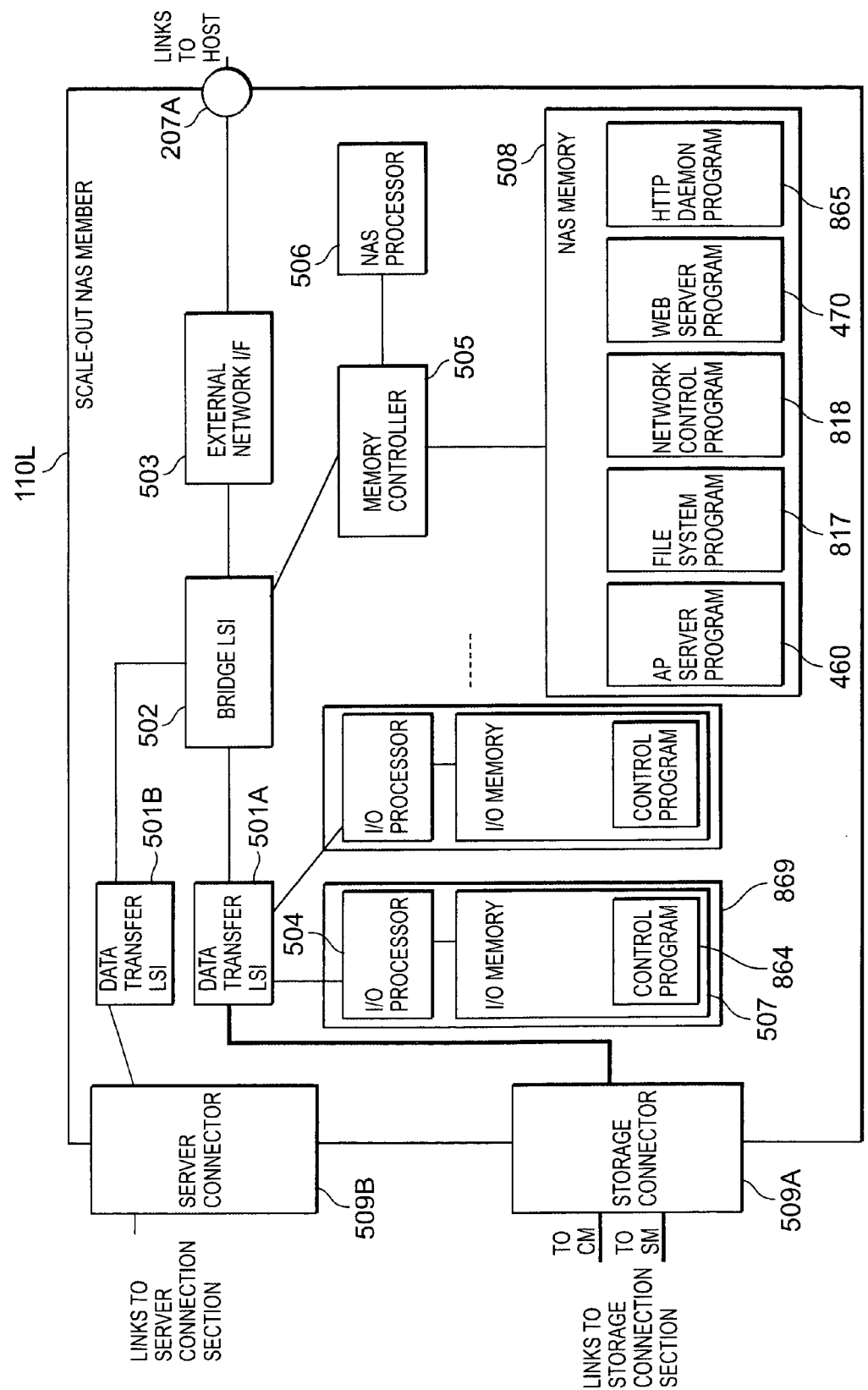
FIG. 4 is a block diagram showing an example of the constitution of the scale-out NAS member 110L.

FIG. 4 is a block diagram showing an example of the constitution of the scale-out NAS member 110L.

The scale-out NAS member 110L comprises a communication port 207A, an external network I/F (interface) 503, data transfer LSI 501A and 501B, a bridge LSI 502, one or a plurality of input/output control units 869 that comprise an I/O processor 504 and an I/O memory 507, a memory controller 505, a NAS processor 506, a NAS memory 508, a storage connector 509A, and a server connector 509B.

The external network I/F 503 performs control of the communication port 207A in accordance with instructions received from the NAS processor 506 via the memory controller 505 and the bridge LSI 502. The external network I/F 503 is a LAN controller, for example.

The bridge LSI 502 is an LSI (Large-Scale Integrated circuit) for enabling mutual communication between the LAN controller 503, memory controller 505, and data transfer LSI 501, for example.

The memory controller 505 is an LSI for controlling communications between the NAS processor 506 and NAS memory 508. The memory controller 505 is connected to the NAS processor 506, the NAS memory 508, and the bridge LSI 502.

The NAS memory 508 is able to store programs that govern the control of the NAS processor 506, data that is exchanged between the CM 130 and host terminal 200, and the like. The NAS memory 508 is able to store a file system program 817, a network control program 818, the WEB server program 470, the AP server program 460, and an HTTP (Hyper Text Transfer Protocol) daemon program 865 for operation as an HTTP daemon, and so forth, for example. The file system program 817 manages the association between a file name included in a file I/O command, and address information (LUN and start logical block address, for example) for the location in which the file with this file name is stored, and converts the file I/O command to a block I/O command on the basis of this association, for example. The network control program 818 is constituted comprising two file system protocols that are NFS (Network File System) and Samba, for example. The NFS receives a file I/O command from a host device on which a UNIX (registered trademark) operating system operated by the NFS is installed. On the other hand, Samba receives a file I/O command from a host terminal on which a Windows (registered trademark) operating system operated by a CIFS (Common Interface File System) is installed.

The NAS processor 506 is a CPU (64-bit CPU, for example) or a microprocessor. The NAS processor 506 is a higher performance processor than the I/O processor 504, for example (with a fast processing speed and high operating clock frequency, for example). The NAS processor 506 is connected to the memory controller 505. The NAS processor 506 is able to read the file system program 817 and network control program 818, and so forth, which are stored in the NAS memory 508, and is able to execute processing in accordance with the computer programs thus read. For example, the NAS processor 506 receives file I/O commands from the host terminal 200 by means of the network control program 818. In addition, the NAS processor 506 is able to convert file I/O commands stored in the NAS memory 508 that have been received from the host terminal 200 into block I/O commands by means of the file system program 817 and output these file I/O commands to the I/O processor 504. Further, for example, by reading the WEB server program 470, the NAS processor 506 is able to operate as a WEB server, and is able to operate as an AP server by reading the AP server program 460.

The I/O processor 504 is a CPU (32-bit CPU, for example) or a microprocessor that is able to execute various processes (described subsequently) that include the exchange of data with the storage connection section 150 and the relay of data communications between the NAS processor 506 and storage connection section 150 and other processes by means of a control program 864 that is read from the I/O memory 507.

The I/O memory 507 stores computer programs that govern the control of the I/O processor 504.

The data transfer LSI 501A is connected to the storage connector 509A, the I/O processor 504, and the bridge LSI 502, and controls the transfer of data (response data that is extracted by DB processing described subsequently, for example). The data transfer LSI 501B is connected to the server connector 509B and the bridge LSI 502 and controls the transfer of the interserver messages (inquiries and responses to same, for example) that are exchanged between NAS heads. The data transfer LSI 501A and data transfer LSI 501B may be disposed physically separately as shown in the figure or may be integrated.

The storage connector 509A is connected to the storage connection section 150. More specifically, for example, the storage connector 509A is connected to a CM transfer path (transfer path connected to the CM 130), which is contained in the storage connection section 150 (transfer path connected to the CM 130), and to an SM transfer path (transfer path connected to the SM 120). Further, there need not be a mixture of the CM transfer path and SM transfer path in a single storage connector 509A. For example, instead of the storage connector 509A, a first storage connector, which is connected to the CM transfer path, and a second storage connector, which is connected to the SM transfer path, may be provided.

The server connector 509B is connected to the server connection section 151. More specifically, for example, the server connector 509B is connected to a transfer path contained in the server connection section 151.

Figure 5:
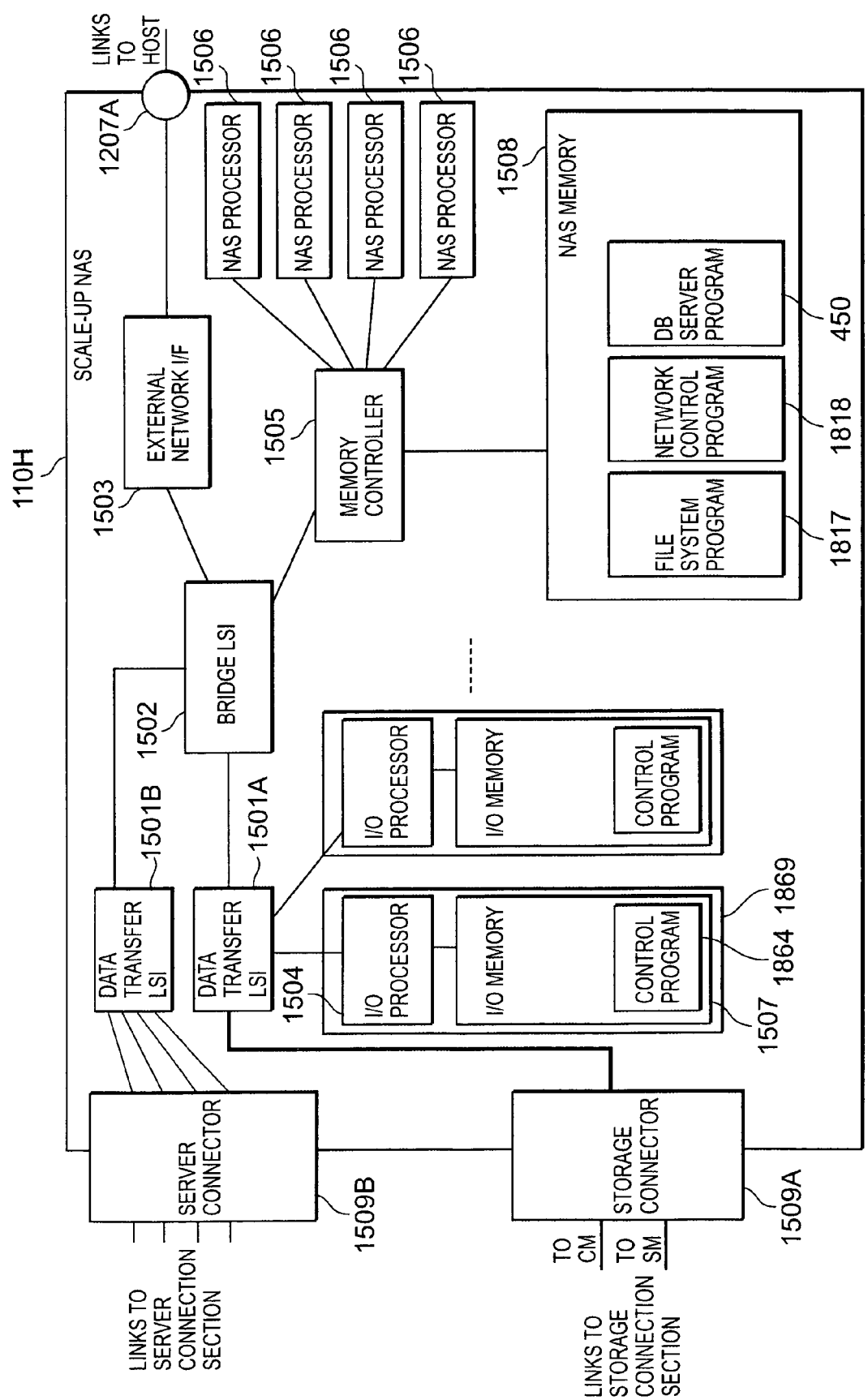
FIG. 5 is a block diagram showing an example of the constitution of the scale-up NAS 110H.

FIG. 5 is a block diagram showing an example of the constitution of the scale-up NAS 110H.

In FIG. 5, reference numbers are different for constituent elements that are the same as the scale-out NAS member 110L but have been assigned the same name. Constituent elements with the same name have the same function. In order to avoid repetition in the description below, the points of difference from the scale-out NAS member 101L are mainly described, while the descriptions of recurring parts are simplified or omitted.

The greatest difference of the scale-up NAS 110H from the scale-out NAS member 110L is that a plurality (for example, four) of NAS processors 1506 share the same NAS memory 1508 via a memory controller 1505. For example, a plurality of NAS processors 1506 read each of the DB server programs 450, the DB processing being shared and performed in parallel by the plurality of NAS processors 1506, whereby high-speed DB processing is implemented. In other words, one high-performance NAS head is provided. Further, the plurality of NAS processors 1506 may be symmetrical multiprocessors (SMP) or may be asymmetrical multiprocessors (AMSP).

A DB server program 1508 is stored in the NAS memory 1508.

Examples of the constitution of the scale-out NAS member 110L and scale-up NAS 110H were provided above. In this embodiment, the scale-up NAS 110H and DKA 140 communicate under the so-called server three-level model within the storage control system 600, and thus data read from the LU 310 (all data related to the DB 103 or response data generated by DB processing, for example) is stored in the NAS memory 1508. However, because the scale-out NAS member 110L and DKA 140 do not communicate, data is not stored in the NAS memory 508 of the scale-out NAS member 110L. For this reason, the NAS memory 508 of the scale-out NAS member 110L may be afforded a smaller storage capacity than the NAS memory 1508 of the scale-up NAS 110H.

Figure 6:
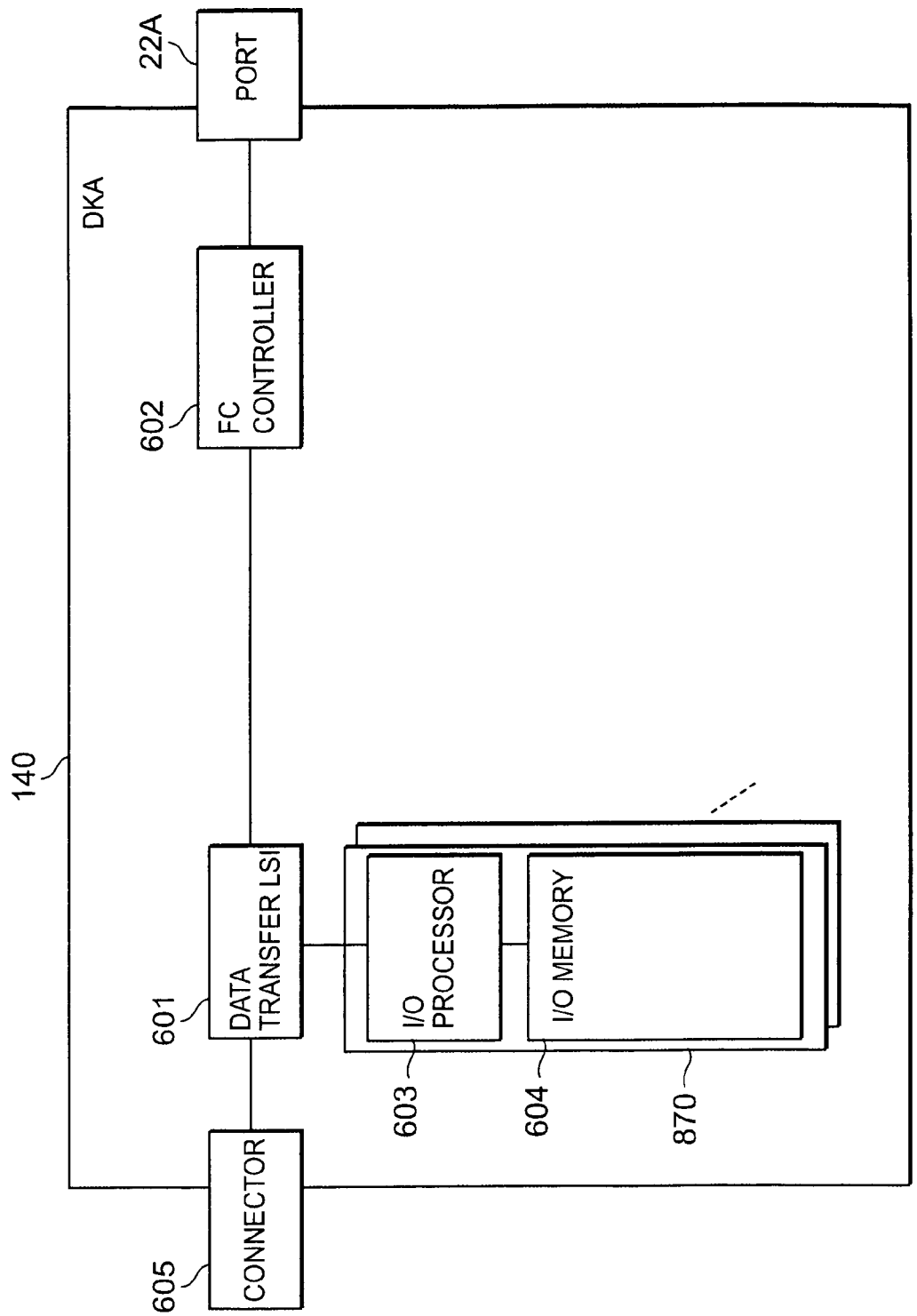
FIG. 6 is a block diagram showing an example of the constitution of a DKA 140.

FIG. 6 is a block diagram showing an example of the constitution of the DKA 140.

The DKA 140 comprises a communication port 22A, an FC controller 602, a data transfer LSI 601, one or a plurality of input/output control units 870 that comprise an IO processor 603 and an I/O memory 604, and a connector 605.

The communication port 22A is a port for communicating with the storage device 300 via a communication network (a Fibre Channel, for example) (not shown).

The FC controller 602 is interposed between the communication port 22A and data transfer LSI 601. The FC controller 602 controls the exchange of block-level data in accordance with the Fibre Channel Protocol, for example.

The I/O memory 604 is for storage of a program that governs the control of the I/O processor 603.

The I/O processor 603 is a CPU or microprocessor. The I/O processor 603 is connected to a data transfer LSI 610, I/O memory 604 and SVP 23, and controls the exchange of data, commands, and the like by reading a variety of computer programs in the I/O memory 604.

The data transfer LSI 601 is connected to a connector 605, which is connected to the storage connection section 150, an I/O processor 603, and an FC controller 602, and is an LSI that controls the data transfer.

In this embodiment, the so-called server three-level model is constructed with a single storage control system 600. Therefore, in the storage control system 600, various process flows according to the server three-level model are executed. Hereinafter, an example of a case where data processing is performed between the WEB server program 470 and the DB server program 450 will be described. Further, in the following description, the WEB server program 470 maybe a WEB application server program integrated with an AP server program 460.

Figure 7:
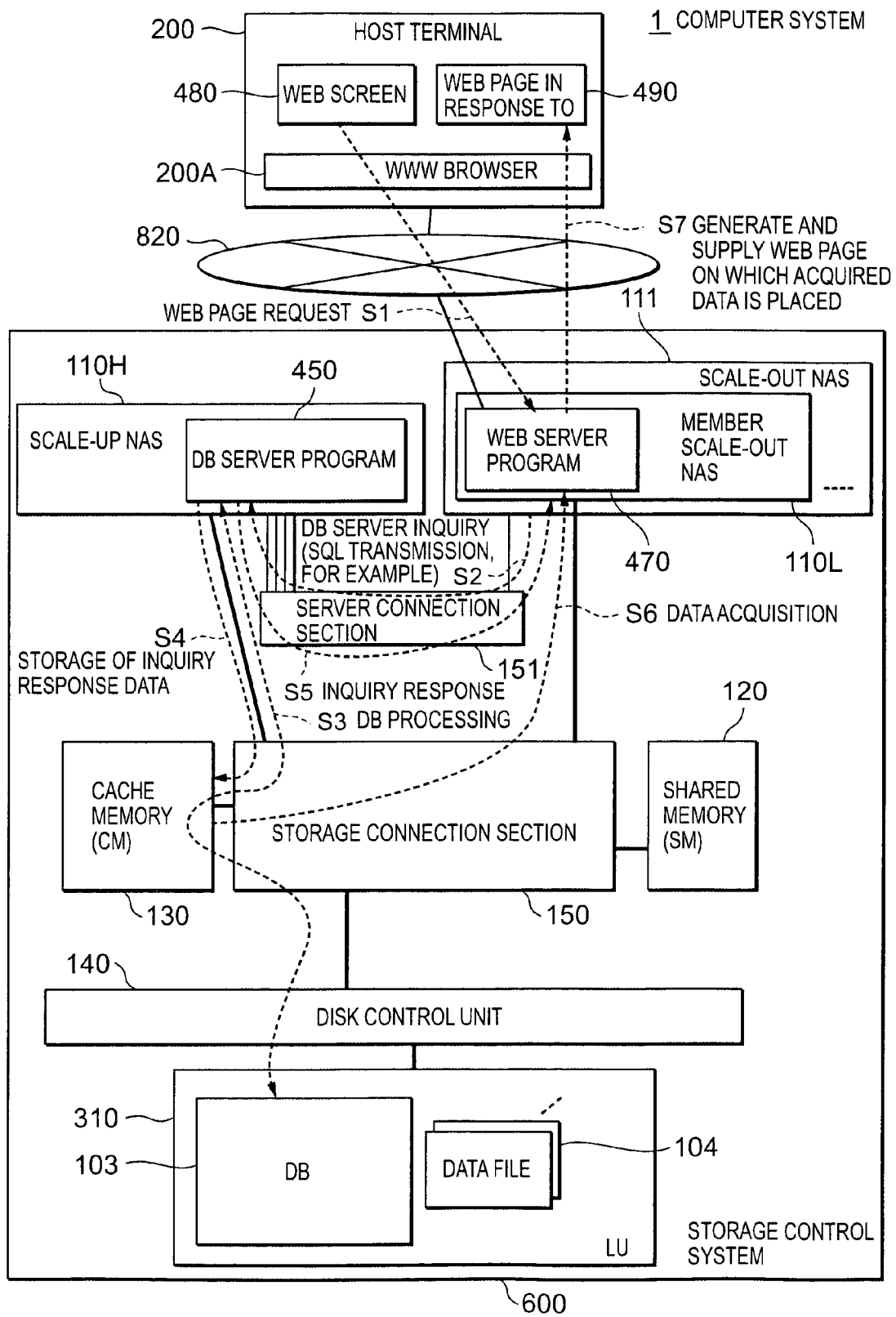
FIG. 7 shows a schematic of the flow of processing performed in a computer system 1 according to this embodiment.

FIG. 7 shows a schematic of the flow of a process performed in a computer system 1 according to this embodiment.

For example, when a user performs a WEB page request operation (an operation that involves pressing an execute search button by inputting the desired keyword, for example) with respect to a certain WEB screen (a WEB page written in HTML, for example) displayed on the host terminal 200, the WEB page request (WEB page with the desired keyword, for example) according to the WEB page request operation is sent from the host terminal 200 to the scale-out NAS member 110L selected from among the scale-out NAS 111 via the communication network 820. (step S1).

The WEB page request received by the scale-out NAS member 110L is analyzed by means of the WEB server program 470 that is read to the NAS processor 506. The WEB server program 470 generates a DB server inquiry message (SQL (Structured Query Language) with the syntax 'SELECT: column name FROM: table name WHERE: condition', for example) on the basis of this WEB page request, and sends the DB server inquiry message to the scale-up NAS 110H via the server connection section 151 (S2). The DB server inquiry message can be generated on the basis of file information that is managed by the file system of the scale-out NAS member 110L, for example.

The DB server inquiry message received by the scale-up NAS 110H is analyzed by the DB server program 450 (that is, a NAS processor selected from among a plurality of NAS processors 1506) that is read to the plurality of NAS processors 1506. The DB server program 450 executes DB processing based on the results of analyzing the DB server inquiry message (S3). This DB processing may be performed by one NAS processor among the plurality of NAS processors 1506 or may be performed by the serial or parallel processing of two or more NAS processors. Further, in the DB processing, at least one NAS processor among the plurality of NAS processors 1506 exchanges data with the I/O processor 603 of the DKA 140, for example, and thus data requested by means of the DB server inquiry message (hereinafter 'inquiry response data') is acquired from the DB (relational database, for example) 103 in the LU 310.

The scale-up NAS 110H that has acquired the inquiry response data writes the inquiry response data to the cache memory 130 via the storage connection section 150 (S4). Next, the scale-up NAS 110H sends an inquiry response message, which is a response to the DB server inquiry message in S2 (an interserver message that includes a pointer indicating the location where the inquiry response data is stored, for example ('cache pointer' hereinafter) to the scale-out NAS member 110L constituting the transmission source of the DB server inquiry message via the server connection section 151 (S5). Accordingly, rather than the inquiry response data itself flowing through the server connection section 151, a response message of a smaller data size flows therethrough. Hence, the transfer bandwidth of the server connection section 151 may be narrower than that of the storage connection section 150. Further, in the DB processing of S3, when inquiry response data has already been written to the cache memory 130, the scale-up NAS 110H does not perform S4, instead transmitting a pointer indicating the storage location of the inquiry response data to the scale-out NAS member 110L via the server connection section 151.

The inquiry response message received by the scale-out NAS member 110L is analyzed by the WEB server program 470 read to the NAS processor 506, for example. In response to this inquiry response message, the WEB server program 470 acquires inquiry response data from the cache memory 130 via the storage connection section 150 (S6). Next, the WEB server program 470 generates a WEB page 490 on which the inquiry response data thus acquired (or data produced from processing this data) is placed, and supplies the WEB page 490 to the host terminal 200, which is the transmission source of the WEB page request in S1 (S7).

A specific example of the flow of the processing S1 to S7 will be described below. In the following description, a branch code is assigned to steps belonging to each step. For example, capitalized alphabetical characters are appended as branch codes after 'S2', as in 'S2A', to steps that belong to S2.

Figure 8:
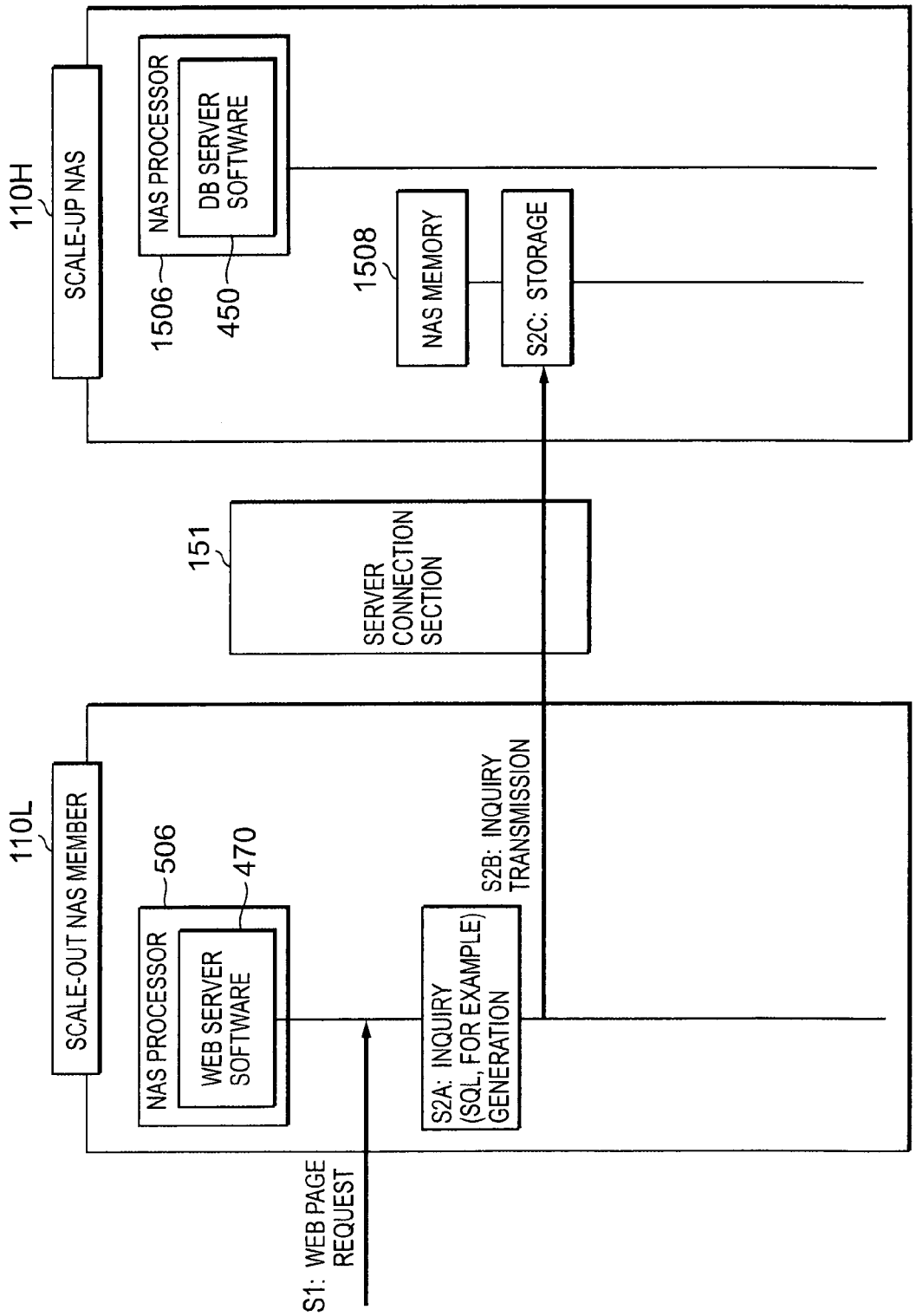
FIG. 8 shows a specific example of the processing of S1 to S2 of FIG. 7.

FIG. 8 shows a specific example of the processing of S1 to S2 of FIG. 7.

In the case of the scale-out NAS member 110L selected from among two or more scale-out NAS members 101L that constitute the scale-out NAS 111, the WEB server program 470 read to the NAS processor 506 acquires the WEB page request received from the host terminal 200 (S1). Next, the WEB server program 470 generates a DB server inquiry message on the basis of the content of the WEB page request (S2A) and sends the DB server inquiry message thus generated to the scale-up NAS 110H via the server connection section 151 (S2B) The DB server inquiry message thus sent is then temporarily stored in the NAS memory 1508 of the scale-up NAS 110H (S2C).

Figure 9:
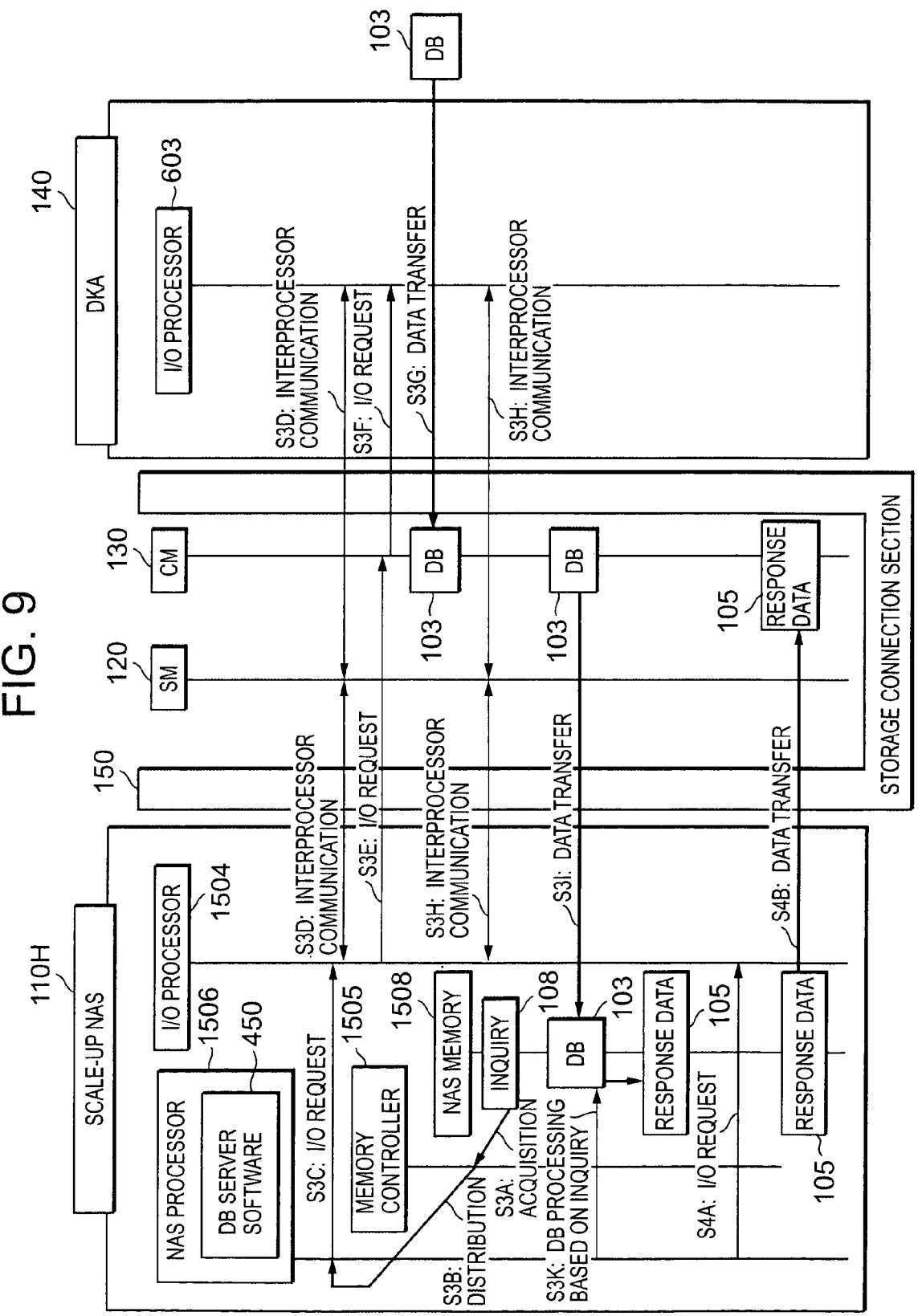
FIG. 9 shows a specific example of the processing of S3 to S4 in FIG. 7.

FIG. 9 shows a specific example of the processing of S3 to S4 in FIG. 7.

The memory controller 1505 in the scale-up NAS 110H acquires a DB server inquiry message 108 stored in the NAS memory 1508 (S3A) and distributes the acquired DB server inquiry message 108 to a NAS processor 1506 selected from the plurality of NAS processors 1506 (S3B).

The NAS processor 1506 to which the DB server inquiry message has been distributed determines the location of the DB 103 (ID, start logical block address and data size of the LU 310, for example) based on the file system managed by the NAS processor 1506, and then sends a block-level I/O request to acquire the DB 103 to the I/O processor 1504 (S3C).

The I/O processor 1504 of the scale-up NAS 110H performs interprocessor communications with the I/O processor 603 of the DKA 140 via the storage connection section 150 and SM 120 (S3D), and sends the I/O request to the I/O processor 603 of the DKA 140 via the storage connection section 150 and CM 130 (S3E).

The I/O processor 603 of the DKA 140 reads an I/O request via the storage connection section 150 from a cache region (region in the CM 130) that is determined by the interprocessor communications (S3F) Next, the I/O processor 603 acquires the DB 103 from the LU 310 in accordance with the I/O request and stores the DB103 in the cache memory 130 via the storage connection section 150 (S3G). Next, the I/O processor 603 of the DKA 140 performs interprocessor communications with the I/O processor 1504 of the scale-up NAS 110H via the storage connection section 150 and SM 120 (S3H).

The I/O processor 1504 of the scale-up NAS 110H reads the DB 103 via the storage connection section 150 from a cache region (region in the CM 130) that is determined by the interprocessor communications (S31), and stores the DB 103 in the NAS memory 1508. One or a plurality of NAS processors 1506 processes the DB 103 stored in the NAS memory 1508 based on the content of the DB server inquiry message distributed in S3B (S3K). For example, one or a plurality of NAS processors 1506 extract data with the keyword desired by the user from the DB 103 stored in the NAS memory 1508.

Inquiry response data 105 is generated by the DB processing of S3K and then stored in the NAS memory 1508.

The NAS processor 1506 selected from among the plurality of NAS processors 1506 sends an I/O request requesting storage of the inquiry response data 105 in the cache memory 130 to the I/O processor 1504 (S4A). In response to the I/O request, the I/O processor 1504 acquires the inquiry response data 105 in the NAS memory 1508 and stores this data 105 in the cache memory 130 (S4B).

Figure 10:
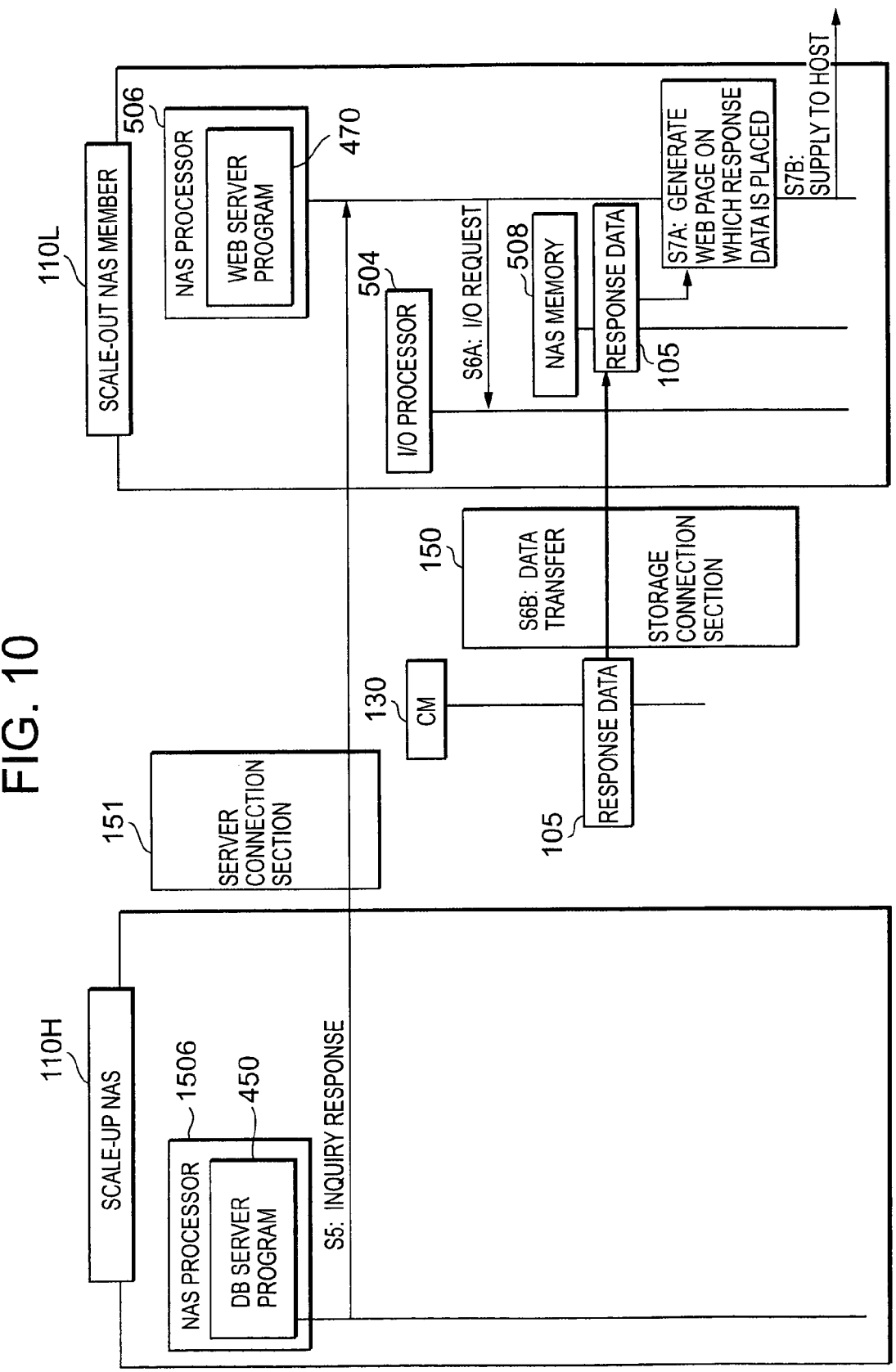
FIG. 10 shows a specific example of the processing of S5 to S7 in FIG. 7.

FIG. 10 shows a specific example of the processing of S5 to S7 in FIG. 7.

The NAS processor 1506 of the scale-up NAS 110H (that is, the DB server program 450) sends an inquiry response message that includes information on the location where the inquiry response data 105 is stored to the scale-out NAS member 110L constituting the transmission source of the DB server inquiry message via the server connection section 151 (S5).

The NAS processor 506 (that is, the WEB server program 470) of the scale-out NAS member 110L outputs the I/O request, which is for acquiring inquiry response data 105 from the location indicated by the information contained in the inquiry response message, to the I/O processor 504 (S6A). The I/O processor 504 acquires the inquiry response data 105 from the cache memory 130 via the storage connection section 150 in accordance with this I/O request, and stores the acquired inquiry response data 105 in the NAS memory 508 (S6B).

The NAS processor 506 generates the WEB page 490 on which the inquiry response data 105 stored in the NAS memory 508 (or data obtained by processing this data) is placed (S7A), and supplies the generated WEB page 490 to the host terminal 200, which is the transmission source of the WEB page request (S7B).

According to the embodiment above, both the scale-out NAS 111 and scale-up NAS 110H are mounted in a single storage control system 600. As a result, the storage control system 600 is rendered a high performance system 600.

Further, according to the above embodiment, each of the two or more scale-out NAS members 110L constituting the scale-out NAS 111, and the scale-up NAS 110H operates as a server. In addition to the storage connection section 150 through which data (user data, for example) that is stored in the LU 310 or read from the LU 310 flows, the storage control system 600 is provided with the server connection section 151 for exchanging interserver messages (data other than the abovementioned data, such as inquiry messages and response messages, for example. Accordingly, a plurality of connection sections is selectively used within the storage control system 600 depending on whether the item exchanged between the scale-out NAS member 110L and the scale-up NAS 110H is data or an interserver message. As a result, efficient data processing can be performed within the storage control system 600.

Further, according to the above embodiment, the scale-out NAS 111 performs processing that can be performed in parallel as per a WEB server or the like, and the scale-up NAS 110H performs processing that is difficult to perform in parallel as per a DB server or the like. As a result, data processing that is more efficient can be executed within the storage control system 600.

Several modifications may be considered for this embodiment.

Figure 11:
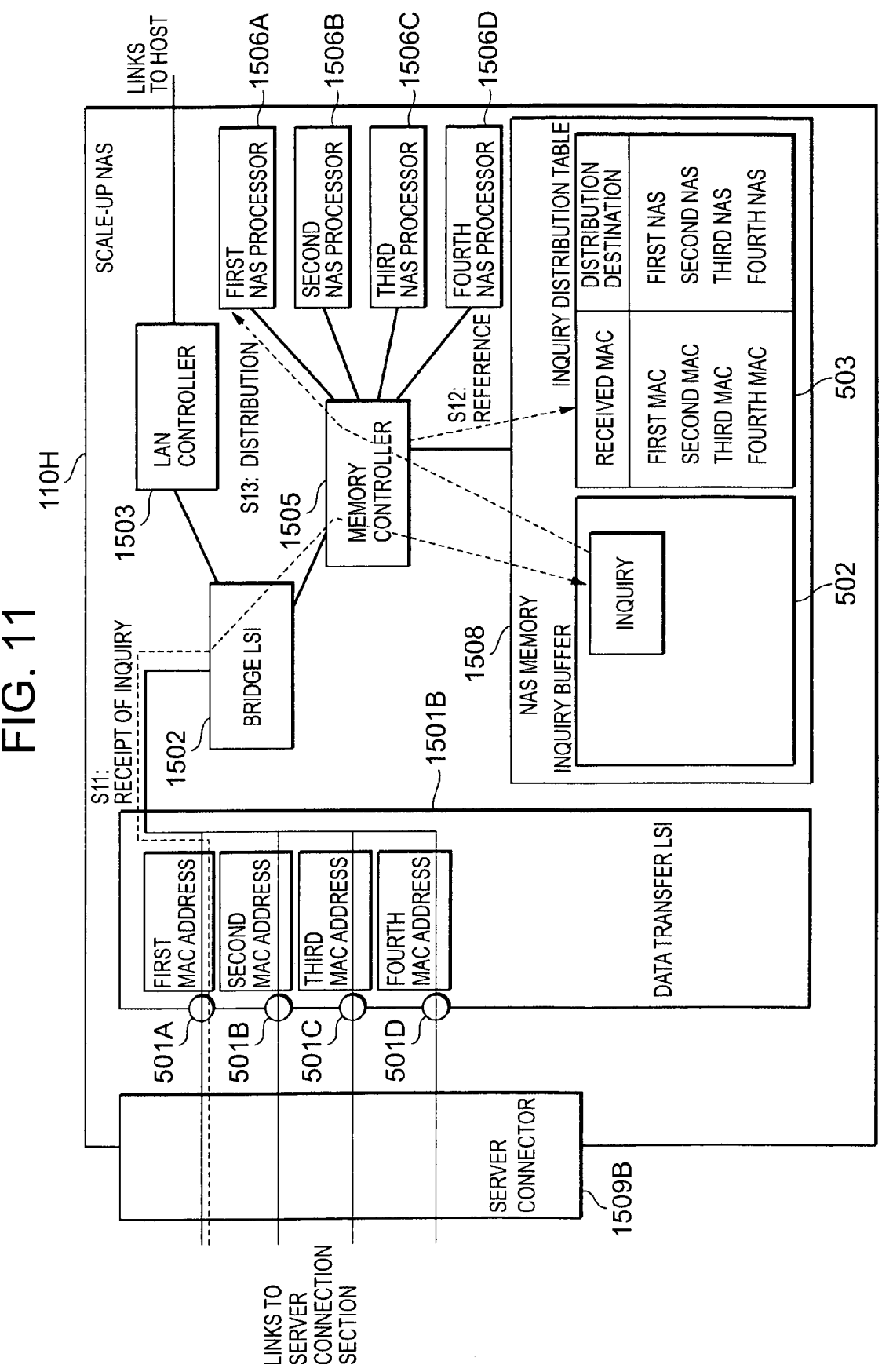
FIG. 11 is an example of the constitution of the scale-up NAS of a first modification of the present invention.

FIG. 11 is an example of the constitution of the scale-up NAS of a first modification of the present invention.

A plurality of input/output ports 501A to 501D are provided in the data transfer LSI connected to a server connector 1509B. A plurality of transfer paths contained in the server connection section 151 are connected to the plurality of input/output ports 501A to 501D respectively. A plurality of port IDs (MAC addresses or IP addresses, for example) is allocated to the plurality of input/output ports 501A to 501D respectively.

A message distribution table 503, and a message buffer 502 are provided in the NAS memory 1508. The message distribution table 503 is a table used to determine to which NAS processor of the plurality of NAS processors 1506 to distribute messages received from the scale-out NAS member 110L. For example, a plurality of distribution destinations corresponding with a plurality of port IDs (MAC addresses, for example) respectively is recorded in the message distribution table 503.

According to the first modification, when an interserver message (inquiry message, for example) from the scale-out NAS member 110L is stored in the message buffer 502 via the first input/output port 501, for example (S11), the memory controller 1505 determines the distribution destination corresponding with the port ID of the input/output port 501A through which the message passes from the message distribution table 503 (S12). The memory controller 1505 then causes a first NAS processor 1506 corresponding to the distribution destination thus determined to process a message that is stored in the message buffer 502 (S13).

FIG. 12 shows an example of data communications between a DKA 22 and at least one of the scale-up NAS 110H and the scale-out NAS member 110L of a second modification of the present invention.

According to the second modification, at least one of the scale-up NAS 110H and scale-out NAS member 110L (generally referred to as the 'NAS head 110' hereinafter) does not have an I/O processor installed and causes the I/O processor 603 of the DKA 22 to perform processing that is executed by the I/O processor in the NAS head.

For example, as shown in FIG. 12 (A), a dedicated interrupt line 510 is provided between the NAS head 110 and the DKA 22. In this case, a block-level I/O request that is outputted by the NAS processor 506 (or 1506) is sent to the I/O processor 603 of the DKA 22 via the dedicated interrupt line 510.

Further, as shown in FIG. 12(B), for example, a command queue 511 is provided in the NAS memory 508 (or 1508) in the NAS head 110. A block-level I/O request outputted by the NAS processor 506 (or 1506) is stored in the command queue 511 (S21). The I/O processor 603 of the DKA 22 performs poling of the command queue (S22), and, upon detecting the existence of an I/O request, acquires the I/O request from the command queue (S23).

Figure 13:
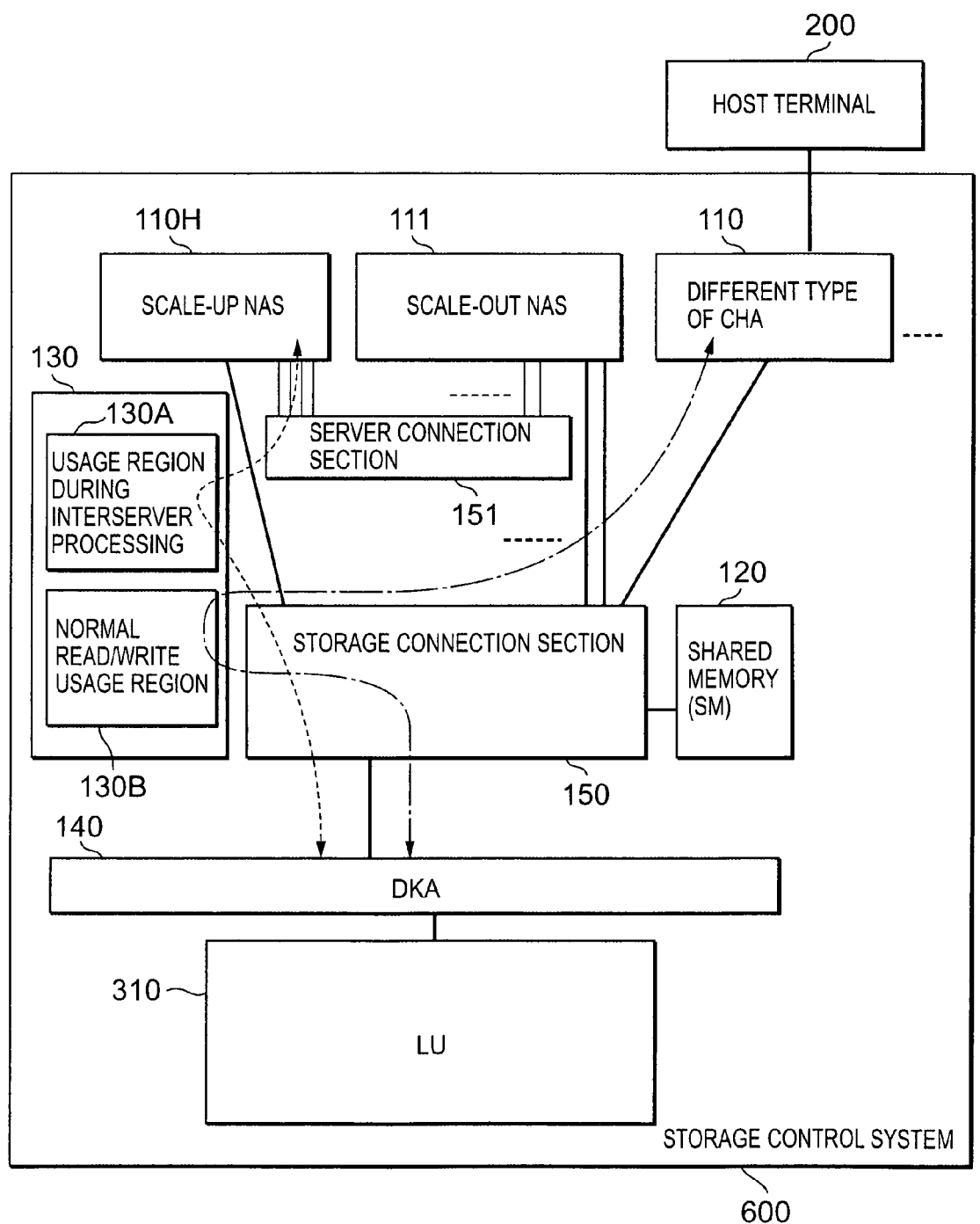
FIG. 13 shows an example of the constitution of a cache memory 130 in a storage control system 600 of a third modification of the present invention.

FIG. 13 shows an example of the constitution of a cache memory 130 in a storage control system 600 of a third modification of the present invention.

In the third modification, a usage region used during interserver processing (hereinafter 'server usage region') 130A, and a normal read/write processing usage region (hereinafter 'normal usage region') 130B are provided in the cache memory 130. 'Interserver processing' is processing that is executed when a server is operated not only as a file server, but also as another type of server (at least one of the WEB server, AP server, and DB server above, for example). 'Normal read/write processing' is processing that receives a read command or write command from the host terminal 200 and, in response to this command, reads data from the LU 310 or writes data to the LU 310.

According to the third modification, any of a plurality of usage regions in the cache memory 130 is selected depending on whether the processing is interserver processing or normal read/write processing.

More specifically, when DB processing is performed between the scale-up NAS 110H and DKA 22, for example, inquiry response data is stored in the server usage region 130A. On the other hand, when data is exchanged with the LU 310 via the DKA 22 as a result of the scale-up NAS 110H, scale-out NAS member 110L, and so forth, operating as a simple file server, for example, or, when a different type of channel adapter (CHA, such as a Fibre Channel Adapter (CHF) that receives a block-level I/O request via the Fibre Channel, for example) 110 exchanges data with the LU 310 via the DKA 22, the data is stored in the normal usage region 130B.

Figure 14:
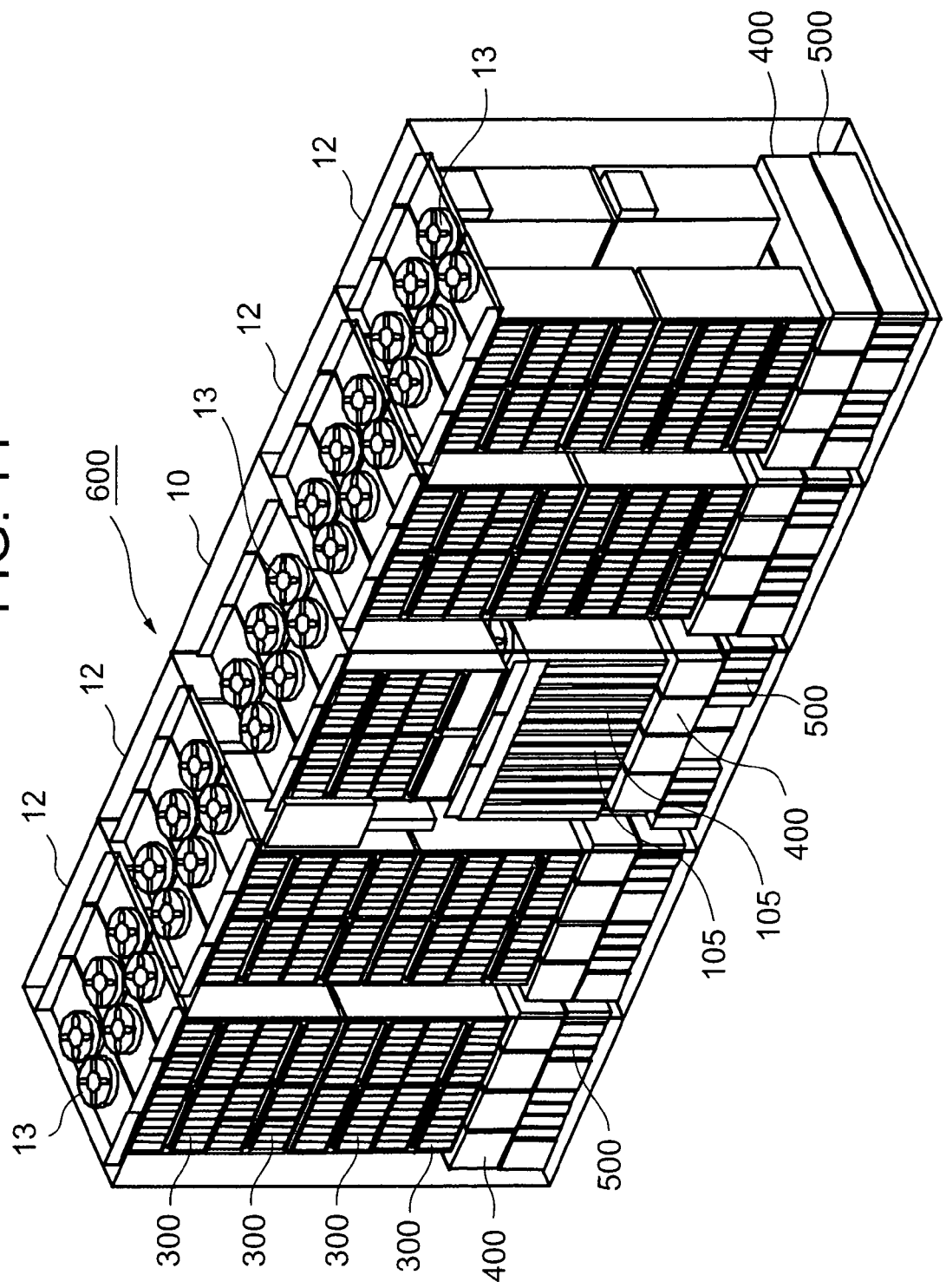
FIG. 14 shows an external view of the storage control system 600 of a fourth modification of the present invention.

FIG. 14 shows an external view of the storage control system 600 of a fourth modification of the present invention.

The storage control system 600 can be constituted by a basic enclosure 10 and a plurality of additional enclosures 12, for example. The additional enclosures 12 are an option for the storage control system 600, it being possible to connect a maximum of four additional enclosures 12 to one basic enclosure 10, for example. A plurality of cooling fans 13 is provided in each additional enclosure 12. Further, each additional enclosure 12 is detachably provided with a plurality of storage devices 300, a plurality of power units 400, and a plurality of battery units 500, each of which is controlled by a control function with which an adapter board inserted in a slot 104 of the basic enclosure 10 is equipped, for example.

Figure 15:
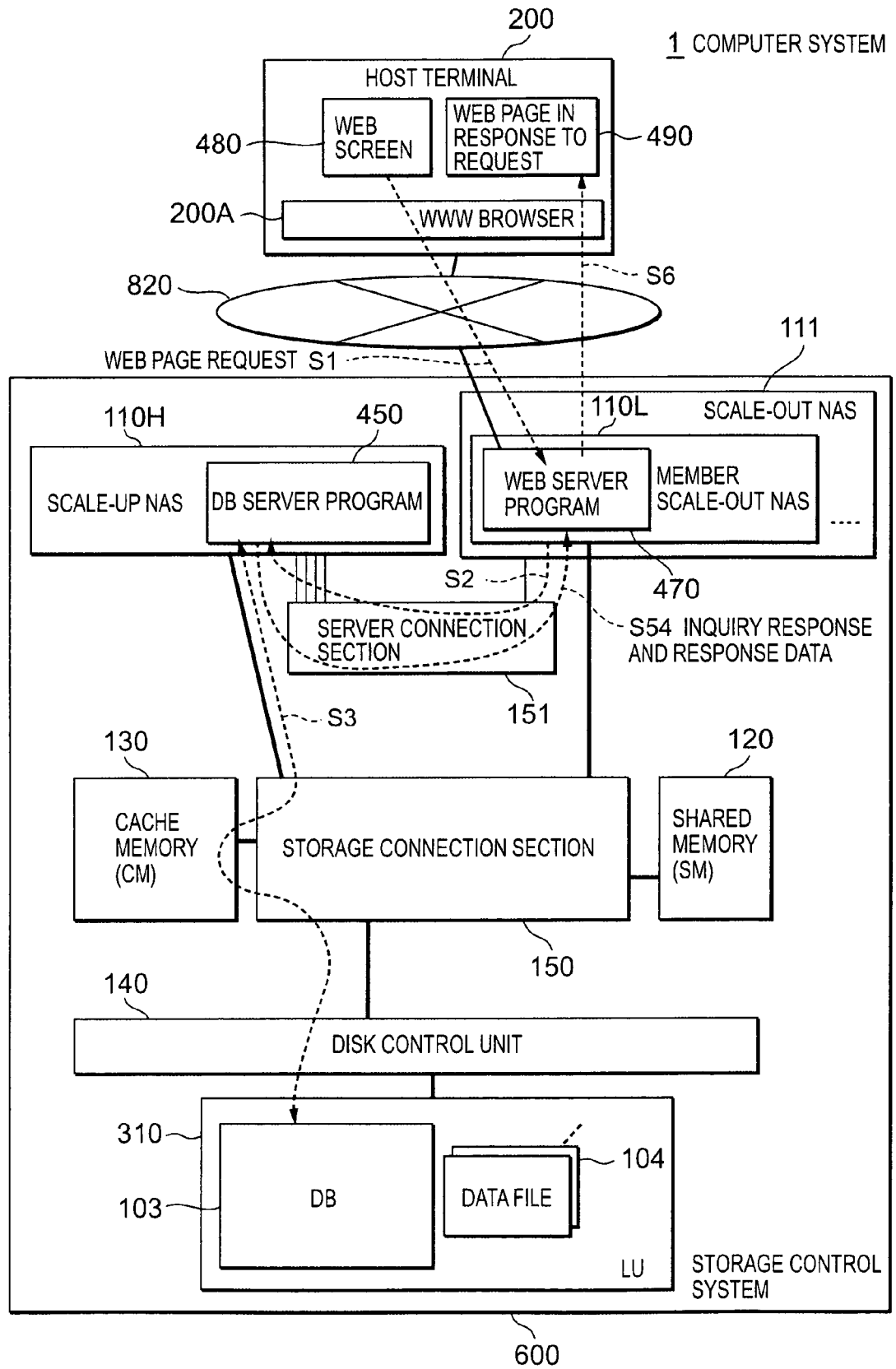
FIG. 15 shows a schematic of the flow of a process performed in the computer system 1 according to a fifth modification of this embodiment.

FIG. 15 shows a schematic of the flow of a process performed in the computer system 1 according to a fifth modification of this embodiment.

The scale-up NAS 110H, which has acquired inquiry response data as a result of the DB processing of S3, sends the inquiry response data to the scale-out NAS member 110L via the server connection section 151 together with an inquiry response message (S54). In this case, the scale-out NAS member 110L generates the WEB page 490 based on the inquiry response data and supplies this WEB page 490 to the host terminal 200 (S6).

In addition, in the fifth modification, the scale-up NAS 110H may select via which of the server connection section 151 and storage connection section 150 to transfer the inquiry response data, based on the data size of the inquiry response data being transferred. A specific example is shown in FIG. 16.

Figure 16:
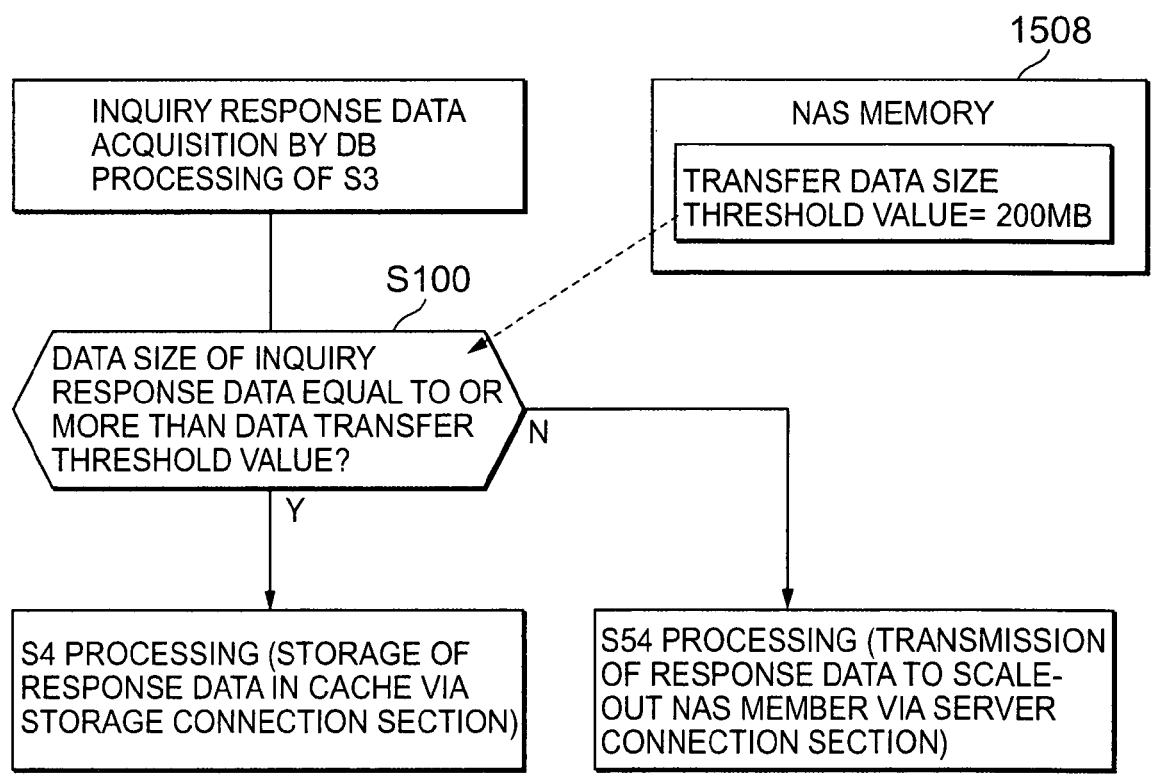
FIG. 16 shows one process that is performed by the scale-up NAS 110H in the fifth modification of this embodiment.

FIG. 16 shows one process that is performed by the scale-up NAS 110H in the fifth modification of this embodiment.

For example, a transfer data size threshold value (whose value is 200 MB, for example) is recorded in the NAS memory 1508 of the scale-up NAS 110H.

When inquiry response data is acquired by means of the DB processing of S3, the scale-up NAS 110H compares the data size of the inquiry response data with the transfer data size threshold value of the NAS memory 1508 (S100). When, as a result of the comparison of S100, it is judged that the data size of the inquiry response data is equal to or more than the threshold value of the transfer data size, the scale-up NAS 110H executes the processing of S4, that is, executes processing to store the inquiry response data in the cache memory 130 via the storage connection section 150. On the other hand, when, as a result of the comparison in S100, it is judged that the data size of the inquiry response data is less than the threshold value for the transfer data size, the scale-up NAS 110H executes the processing of S54, that is, executes processing to send the inquiry response data to the scale-out NAS member 110L via the server connection section 151.

An embodiment of the present invention and modifications thereof were described above but are merely examples serving to illustrate the present invention, there being no intention to limit the scope of the present invention to this embodiment and the modifications. The present invention can also be implemented by a variety of other embodiments. For example, the WEB server, AP server and DB server need not be separate from one another. More specifically, for example, the WEB server program 470 may be equipped with all or some of the functions of an AP server, and the DB server program 450 may be provided with all of some of the functions of an AP server. Moreover, for example, the scale-up NAS 110H and/or scale-out NAS member 110L may select via which of the storage connection section 150 and server connection section 151 data is to be sent and send data via the connection section thus selected on the basis of not only the data size of the data but also predetermined conditions (the attributes and so forth of the transmission target data, for example).

What is claimed is:

1. The storage control system, comprising:
   a storage device that stores data;
   a storage device control unit that reads or writes data with respect to the storage device;
   a plurality of channel control units that operate as servers;
   one or more memories for storing the data exchanged between the storage device control unit and a channel control unit selected from among the plurality of channel control units,
   a data communication medium connected to the storage device control unit, the plurality of channel control units, and the one or more memories, that constitutes a communication medium for data exchanged between the storage device control unit, the selected channel control unit and the one or more memories; and
   an interserver communication medium connected to the plurality of channel control units, that constitutes a communication medium for interserver messages exchanged between the plurality of channel control units,
   wherein the plurality of channel control units are mounted in the same enclosure and comprise two or more Network Attached Storage (NAS) head members that constitute a scale out NAS head group and a scale up NAS head which has a higher-performance NAS head than the scale out NAS head group,
   wherein the enclosure comprises a plurality of general-purpose slots each being a slot into which a NAS head member and another type of channel control unit that differs from the NAS head member can be inserted,
   wherein each of the two or more NAS head members is inserted in one of the general-purpose slots,
   wherein the scale up NAS head is mounted within the enclosure in a different location from the plurality of general-purpose slots, and
   wherein each of said scale out NAS head group and said scale up NAS head processes block-level data,
   wherein at least one of the scale out NAS head group, the scale up NAS head and the storage device control unit comprises a first processor that performs the processing of block-level data,
   wherein the scale out NAS head group comprises one or more first memories that are different from the one or more memories, and one or more second processors of a higher performance than the first processor, each of the one or more first memories being used by one second processor among the one or more second processors rather than being shared by the one or more second processors, and
   wherein the scale up NAS head comprises a second memory that is different from the one or more memories, and a plurality of third processors of a higher performance than the first processor, the second memory being shared by the plurality of processors.

2. The storage control system according to claim 1, wherein a database exists in the storage device,
   wherein the one or more second processors of the scale out NAS head group, operates as a WEB server by reading a computer program for operation as a WEB server, and
   wherein the plurality of third processors of the scale up NAS head operates as a database server by reading a computer program for operation as a database server that processes the database.

3. The storage control system according to claim 2
   wherein the one or more second processors of the scale out NAS head group sends said inquiry in accordance with access by an external device that is connected to an external communication network of the storage control system to said scale up NAS head via the interserver communication medium;
   at least one of the plurality of third processors perform the processing of the database via the storage device control unit in accordance with the inquiry, and thus reads the response data and sends scale up NAS head the response message to the one or more second processors of the scale out NAS head group via the interserver communication medium, and
   wherein the one or more second processors receives the inquiry message, acquires the response data stored in the one or more memories via the data communication medium, and provides the external device with the acquired response data or with data that is obtained by processing the response data.

4. The storage control system according to claim 1, wherein the data communication medium has a wider data transfer bandwidth than the interserver communication medium, and wherein the interserver communication medium has a larger number of communication paths than the data communication medium.

5. The storage control system according to claim 1, wherein the scale up NAS head comprises:

a communication controller that comprises a plurality of communication ports connected to a plurality of transfer paths that are contained in the interserver communication medium; and a memory controller that receives, from the communication controller an interserver message received from the scale out NAS head group by the communication port, and wherein the memory controller selects a third processor for processing the received interserver message from among the plurality of third processors based on which communication port among the plurality of communication ports has received the interserver message, and causes the selected third processor to process the received interserver message.

6. The storage control system according to claim 1, wherein both the scale out NAS head group and the scale up NAS head comprise a communication interface that is connected to an external communication network of the storage control system.

7. The storage control system according to claim 1, wherein each of the scale out NAS head group an the scale up NAS head comprises a NAS processor that converts file-level data to block-level data, and wherein the storage device control unit comprises an input/output processor that acquires and processes the block-level data thus converted by the NAS processor.

8. A storage control system, comprising:

a storage device control unit that reads or writes data with respect to a storage device that stores data;

a plurality of channel control units that operate as servers;

one or more memories in which data exchanged between a channel control unit selected from among the plurality of channel control units and the storage device control unit is stored; and a data communication medium connected to the storage device control unit, the plurality of channel control units and the one or more memories, that constitutes a communication medium for data exchanged between the storage device control unit, the selected channel control unit and the one or more memories, wherein the plurality of channel control units comprise two or more scale out channel members that constitute a scale out channel control unit group, and a scale up channel constituting a channel control unit of a higher performance than the channel members of the scale out channel control unit group; and an interserver communication medium constituting a communication medium for interserver messages that are exchanged between the channel members of the scale out channel control unit group and the scale up channel being provided separately from the data communication medium, wherein each of said scale out channel control unit and said scale up channel processes block-level data, wherein at least one of the scale out channel control unit, the scale up channel and the storage device control unit comprises a first processor that performs the processing of block-level data, wherein the scale out channel control unit comprises one or more first memories that are different from the one or more memories, and one or more second processors of a higher performance than the first processor, each of the one or more first memories being used by one second processor among the one or more second processors rather than being shared by the one or more second processors, and wherein the scale up channel comprises a second memory that is different from the one or more memories, and a plurality of third processors of a higher performance than the first processor, the second memory being shared by the plurality of processors.

* * * * *